(12) United States Patent
Ryu et al.

(10) Patent No.: US 11,564,209 B2
(45) Date of Patent: Jan. 24, 2023

(54) RESOURCE SELECTION IN AN ANCHOR-CLIENT NETWORK

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Franklin Park, NJ (US); Tao Luo, San Diego, CA (US); Xiaoxia Zhang, San Diego, CA (US); Peter Gaal, San Diego, CA (US); Juan Montojo, San Diego, CA (US); Arumugam Chendamarai Kannan, San Diego, CA (US); Jelena Damnjanovic, Del Mar, CA (US); Xiaojie Wang, Hillsborough, NJ (US); Jing Sun, San Diego, CA (US); Piyush Gupta, Bridgewater, NJ (US); Ozcan Ozturk, San Diego, CA (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 17/148,213

(22) Filed: Jan. 13, 2021

(65) Prior Publication Data

US 2022/0225309 A1 Jul. 14, 2022

(51) Int. Cl.
*H04W 72/04* (2009.01)

(52) U.S. Cl.
CPC .............................. *H04W 72/0406* (2013.01)

(58) Field of Classification Search
CPC ............. H04W 72/04; H04W 72/0406; H04W 72/042; H04W 72/0426; H04W 72/048
See application file for complete search history.

(56) References Cited

U.S. PATENT DOCUMENTS

2015/0249979 A1 9/2015 Kim et al.
2018/0205528 A1* 7/2018 Bai ....................... H04L 5/0005

FOREIGN PATENT DOCUMENTS

EP 3890417 A1 * 10/2021 ........ H04W 72/0406
WO 2020030162 A1 2/2020

OTHER PUBLICATIONS

International Search Report and Written Opinion—PCT/US2022/070134—ISA/EPO—dated May 2, 2022.

* cited by examiner

*Primary Examiner* — Kevin Kim
(74) *Attorney, Agent, or Firm* — Qualcomm Incorporated

(57) ABSTRACT

Various aspects of the present disclosure generally relate to wireless communication. In some aspects, a first wireless communication device may transmit an anchor status notification associated with a first future communication between the first wireless communication device and a second wireless communication device. The first wireless communication device may receive, using at least one set of dedicated resources, at least one announcement from at least one additional wireless communication device, wherein the at least one announcement indicates at least one second future communication associated with the at least one additional wireless communication device. Numerous other aspects are described.

30 Claims, 16 Drawing Sheets

RESOURCE SELECTION IN AN ANCHOR-CLIENT NETWORK

FIELD OF THE DISCLOSURE

Aspects of the present disclosure generally relate to wireless communication and to techniques and apparatuses for resource selection in an anchor-client network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first wireless communication device includes transmitting an anchor status notification associated with a first future communication between the first wireless communication device and a second wireless communication device; and receiving, using at least one set of dedicated resources, at least one announcement from at least one additional wireless communication device, wherein the at least one announcement indicates at least one second future communication associated with the at least one additional wireless communication device.

In some aspects, a method of wireless communication performed by a wireless communication device includes receiving, from an anchor device and using a first set of dedicated resources, an anchor status notification associated with a first future communication; and transmitting, based at least in part on the anchor status notification and using a second set of dedicated resources, an announcement that indicates a second future communication.

In some aspects, a method of wireless communication performed by a wireless communication device includes receiving, from an anchor device and using a first set of dedicated resources, an anchor status notification associated with a first future communication; and receiving from the anchor device, based at least in part on the anchor status notification, a resource recommendation associated with the first future communication.

In some aspects, a method of wireless communication performed by a wireless communication device includes receiving, from an anchor device and using a first set of dedicated resources, an anchor status notification associated with a first future communication; and transmitting to the anchor device, based at least in part on the anchor status notification, a resource recommendation associated with the first future communication.

In some aspects, a first wireless communication device for wireless communication includes a memory and one or more processors operatively coupled to the memory, the memory and the one or more processors configured to: transmit an anchor status notification associated with a first future communication between the first wireless communication device and a second wireless communication device; and receive, using at least one set of dedicated resources, at least one announcement from at least one additional wireless communication device, wherein the at least one announcement indicates at least one second future communication associated with the at least one additional wireless communication device.

In some aspects, a wireless communication device for wireless communication includes a memory and one or more processors operatively coupled to the memory, the memory and the one or more processors configured to: receive, from an anchor device and using a first set of dedicated resources, an anchor status notification associated with a first future communication; and transmit, based at least in part on the anchor status notification and using a second set of dedicated resources, an announcement that indicates a second future communication.

In some aspects, a wireless communication device for wireless communication includes a memory and one or more processors operatively coupled to the memory, the memory and the one or more processors configured to: receive, from an anchor device and using a first set of dedicated resources, an anchor status notification associated with a first future communication; and receive from the anchor device, based at least in part on the anchor status notification, a resource recommendation associated with the first future communication.

In some aspects, a wireless communication device for wireless communication includes a memory and one or more processors operatively coupled to the memory, the memory and the one or more processors configured to: receive, from an anchor device and using a first set of dedicated resources, an anchor status notification associated with a first future communication; and transmit to the anchor device, based at least in part on the anchor status notification, a resource recommendation associated with the first future communication.

In some aspects, a non-transitory computer-readable medium storing a set of instructions for wireless communication includes one or more instructions that, when executed by one or more processors of a first wireless communication device, cause the first wireless communication device to: transmit an anchor status notification associated with a first future communication between the first wireless communication device and a second wireless communication device; and receive, using at least one set of dedicated resources, at least one announcement from at least one additional wireless communication device, wherein the at least one announcement indicates at least one second future communication associated with the at least one additional wireless communication device.

In some aspects, a non-transitory computer-readable medium storing a set of instructions for wireless communication includes one or more instructions that, when executed by one or more processors of a wireless communication device, cause the wireless communication device to: receive, from an anchor device and using a first set of dedicated resources, an anchor status notification associated with a first future communication; and transmit, based at least in part on the anchor status notification and using a second set of dedicated resources, an announcement that indicates a second future communication.

In some aspects, a non-transitory computer-readable medium storing a set of instructions for wireless communication includes one or more instructions that, when executed by one or more processors of a wireless communication device, cause the wireless communication device to: receive, from an anchor device and using a first set of dedicated resources, an anchor status notification associated with a first future communication; and receive from the anchor device, based at least in part on the anchor status notification, a resource recommendation associated with the first future communication.

In some aspects, a non-transitory computer-readable medium storing a set of instructions for wireless communication includes one or more instructions that, when executed by one or more processors of a wireless communication device, cause the wireless communication device to: receive, from an anchor device and using a first set of dedicated resources, an anchor status notification associated with a first future communication; and transmit to the anchor device, based at least in part on the anchor status notification, a resource recommendation associated with the first future communication.

In some aspects, a first apparatus for wireless communication includes means for transmitting an anchor status notification associated with a first future communication between the first apparatus and a second apparatus; and means for receiving, using at least one set of dedicated resources, at least one announcement from at least one additional apparatus, wherein the at least one announcement indicates at least one second future communication associated with the at least one additional apparatus.

In some aspects, an apparatus for wireless communication includes means for receiving, from an anchor device and using a first set of dedicated resources, an anchor status notification associated with a first future communication; and means for transmitting, based at least in part on the anchor status notification and using a second set of dedicated resources, an announcement that indicates a second future communication.

In some aspects, an apparatus for wireless communication includes means for receiving, from an anchor device and using a first set of dedicated resources, an anchor status notification associated with a first future communication; and means for receiving from the anchor device, based at least in part on the anchor status notification, a resource recommendation associated with the first future communication.

In some aspects, an apparatus for wireless communication includes means for receiving, from an anchor device and using a first set of dedicated resources, an anchor status notification associated with a first future communication; and means for transmitting to the anchor device, based at least in part on the anchor status notification, a resource recommendation associated with the first future communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
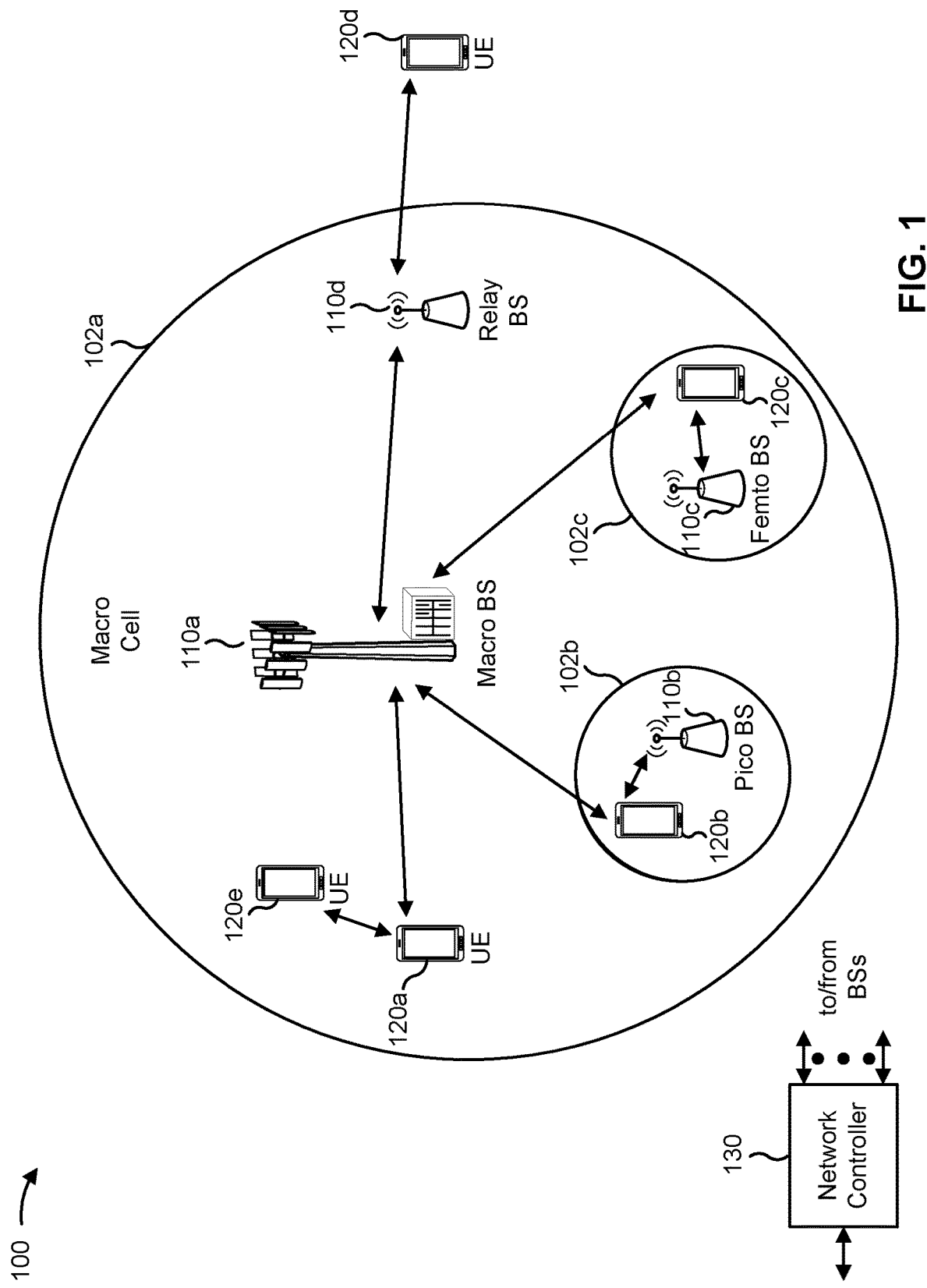
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, "NTN" may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
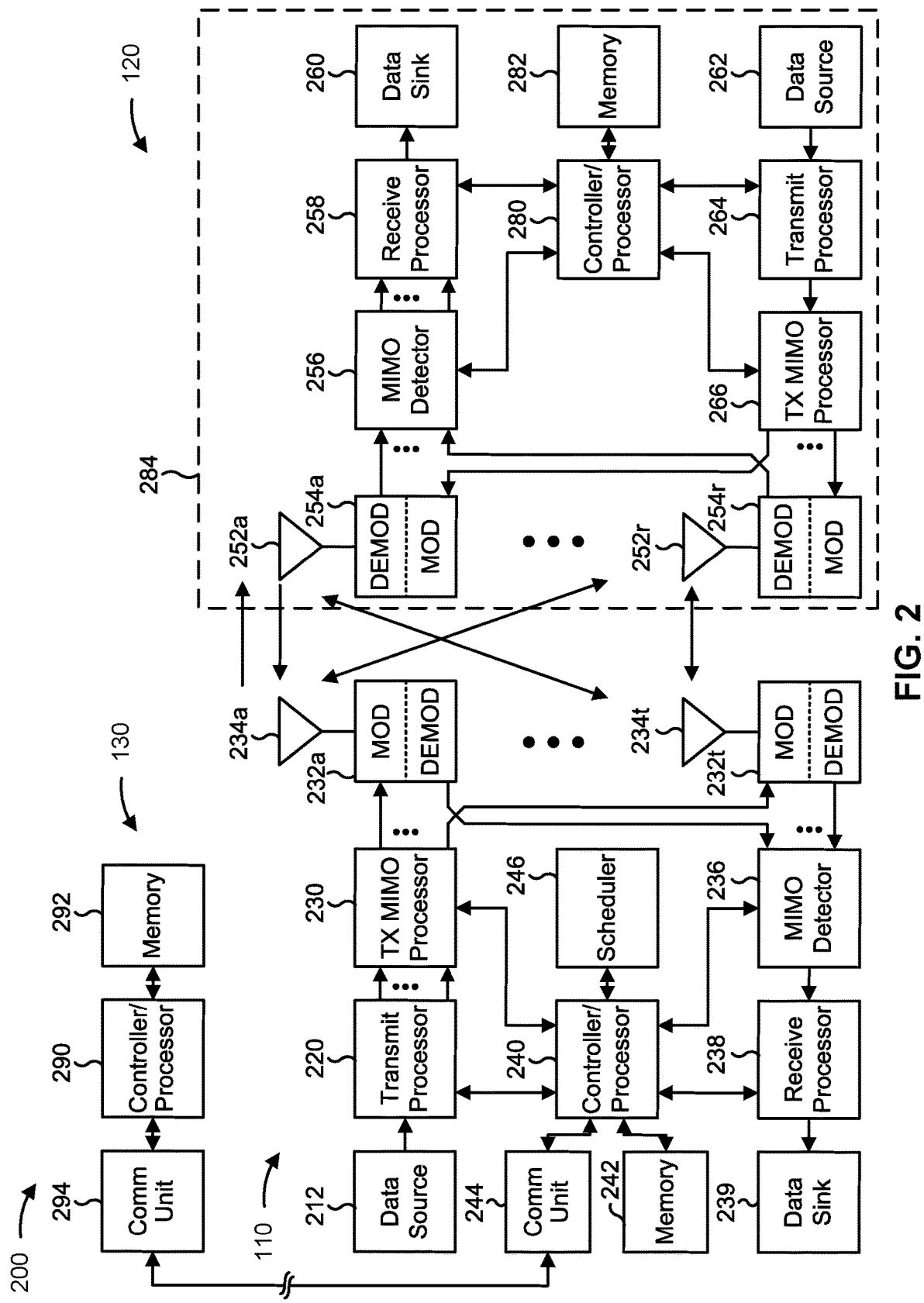
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8-15.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8-15.

Controller/processor 240 of base station 110, controller/processor 280 of UE 120, and/or any other component(s) of FIG. 2 may perform one or more techniques associated with resource selection in an anchor-client network, as described in more detail elsewhere herein. In some aspects, the wireless communication device described herein is the base station 110, is included in the base station 110, or includes one or more components of the base station 110 shown in FIG. 2. In some aspects, the wireless communication device described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 1200 of FIG. 12, process 1300 of FIG. 13, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, process 1500 of FIG. 15, and/or other processes as described herein. In some aspects, executing instructions may include running the instructions, converting the instructions, compiling the instructions, and/or interpreting the instructions, among other examples.

In some aspects, the first wireless communication device includes means for transmitting an anchor status notification associated with a first future communication between the first wireless communication device and a second wireless communication device; and/or means for receiving, using at least one set of dedicated resources, at least one announcement from at least one additional wireless communication device, wherein the at least one announcement indicates at least one second future communication associated with the at least one additional wireless communication device. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless communication device includes means for determining an available resource set based at least in part on the at least one announcement; and/or means for communicating with the second wireless communication device using the available resource set. In some aspects, the first wireless communication device includes means for communicating with the second wireless communication device using a beam. In some aspects, the first wireless communication device includes means for receiving an additional anchor status notification from a second anchor; and/or means for selecting the beam from a plurality of beams based at least in part on the additional anchor status notification.

In some aspects, the first wireless communication device includes means for receiving, from the second wireless communication device, a resource recommendation that indicates a recommended set of resources for the first future communication. In some aspects, the first wireless communication device includes means for transmitting, to the second wireless communication device, a resource recommendation that indicates a recommended set of resources for the first future communication.

In some aspects, the wireless communication device includes means for receiving, from an anchor device and using a first set of dedicated resources, an anchor status notification associated with a first future communication; and/or means for transmitting, based at least in part on the anchor status notification and using a second set of dedicated resources, an announcement that indicates a second future communication. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless communication device includes means for receiving, from an anchor device and using a first set of dedicated resources, an anchor status notification associated with a first future communication; and/or means for receiving from the anchor device, based at least in part on the anchor status notification, a resource recommendation associated with the first future communication. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless communication device includes means for transmitting the first future communication to the anchor device using a selected set of resources, wherein the selected set of resources is based at least in part on the resource recommendation. In some aspects, the wireless communication device includes means for selecting the selected set of resources based at least in part on the resource recommendation. In some aspects, the wireless communication device includes means for receiving, from an additional wireless communication device, an announcement that indicates a second future communication, In some aspects, the wireless communication device includes means for receiving, from an anchor device and using a first set of dedicated resources, an anchor status notification associated with a first future communication; and/or means for transmitting to the anchor device, based at least in part on the anchor status notification, a resource recommendation associated with the first future communication. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless communication device includes means for transmitting an additional anchor status notification associated with the first future communication. In some aspects, the wireless communication device includes means for receiving, from an additional wireless communication device, an announcement that indicates a second future communication, While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
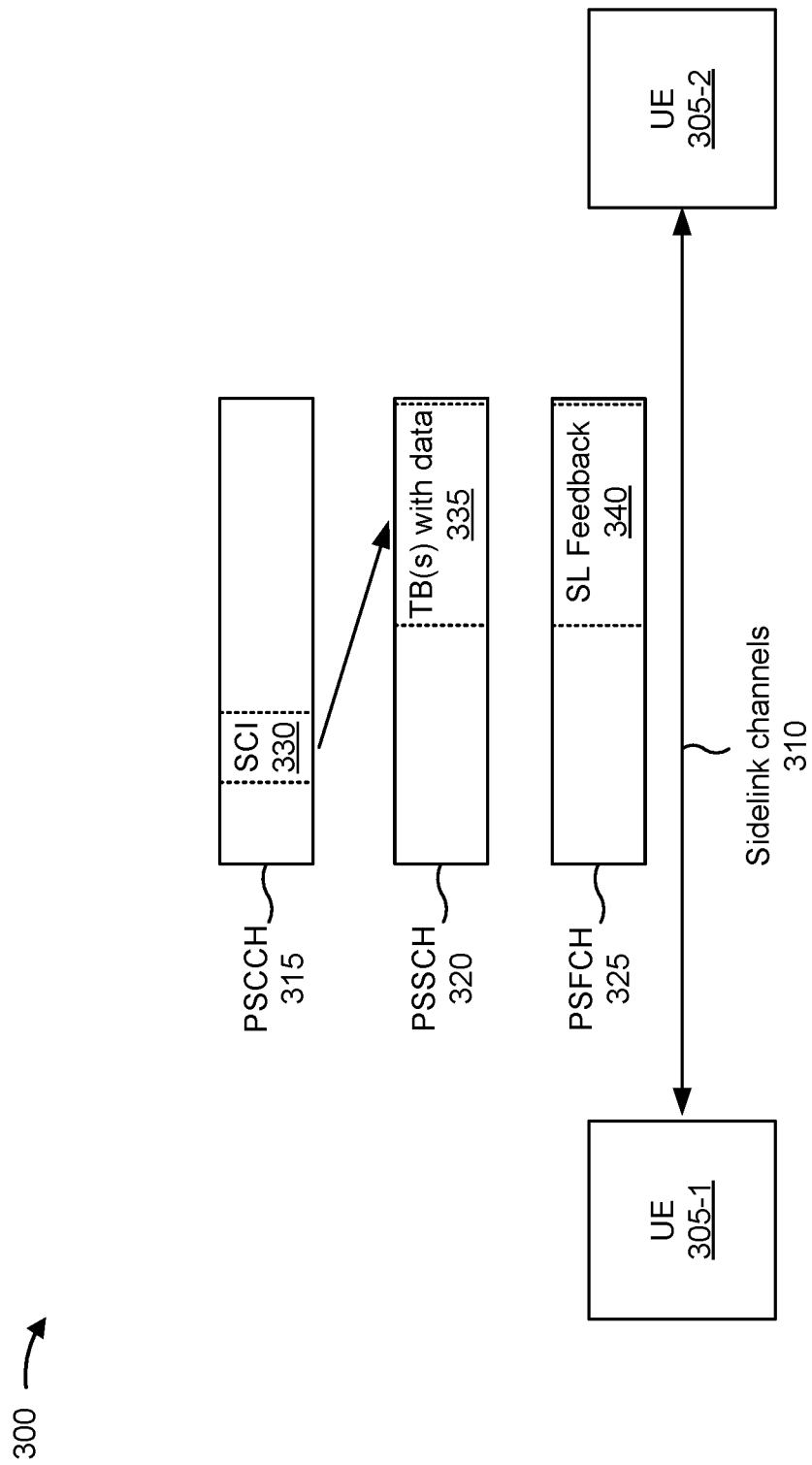
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
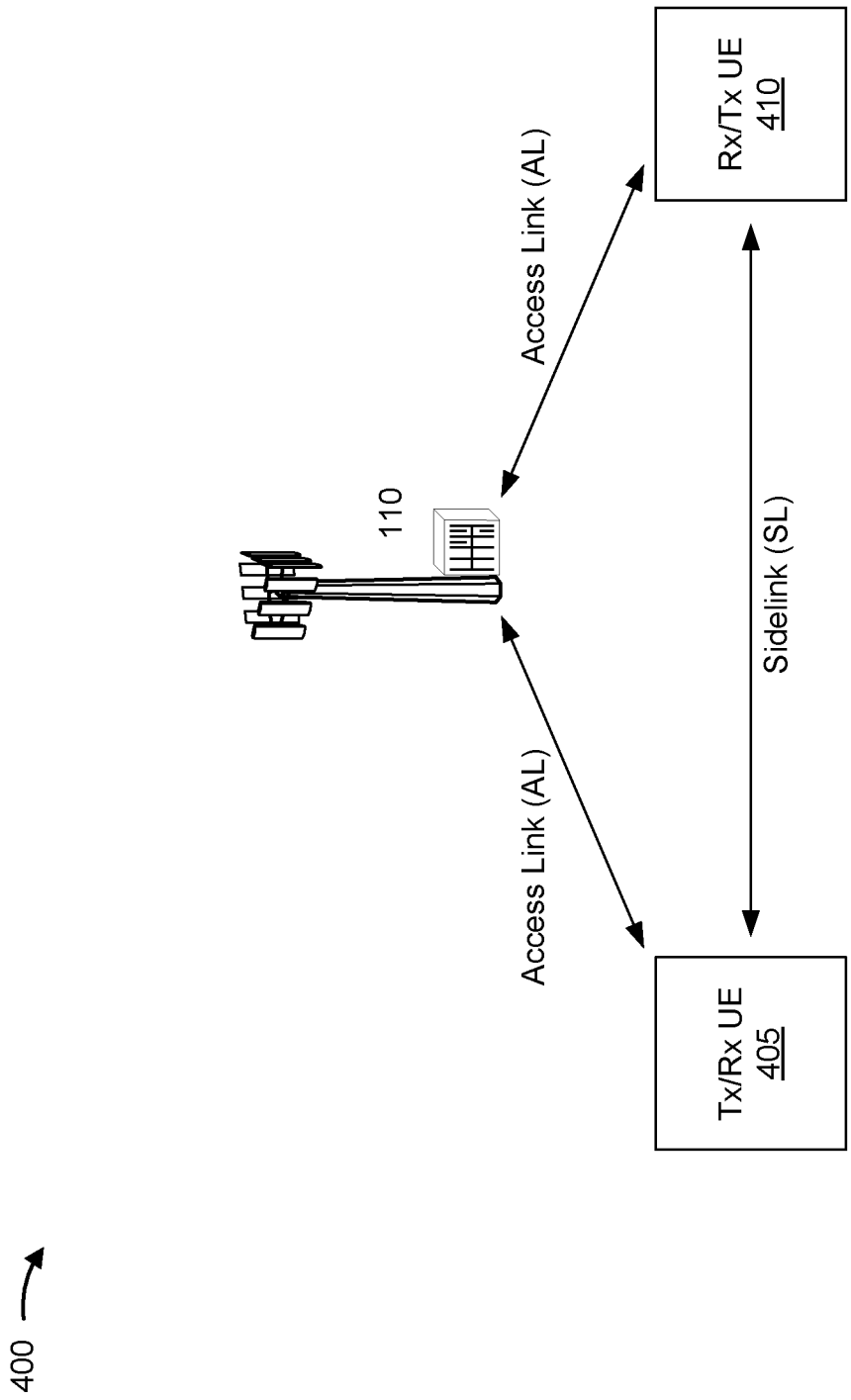
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
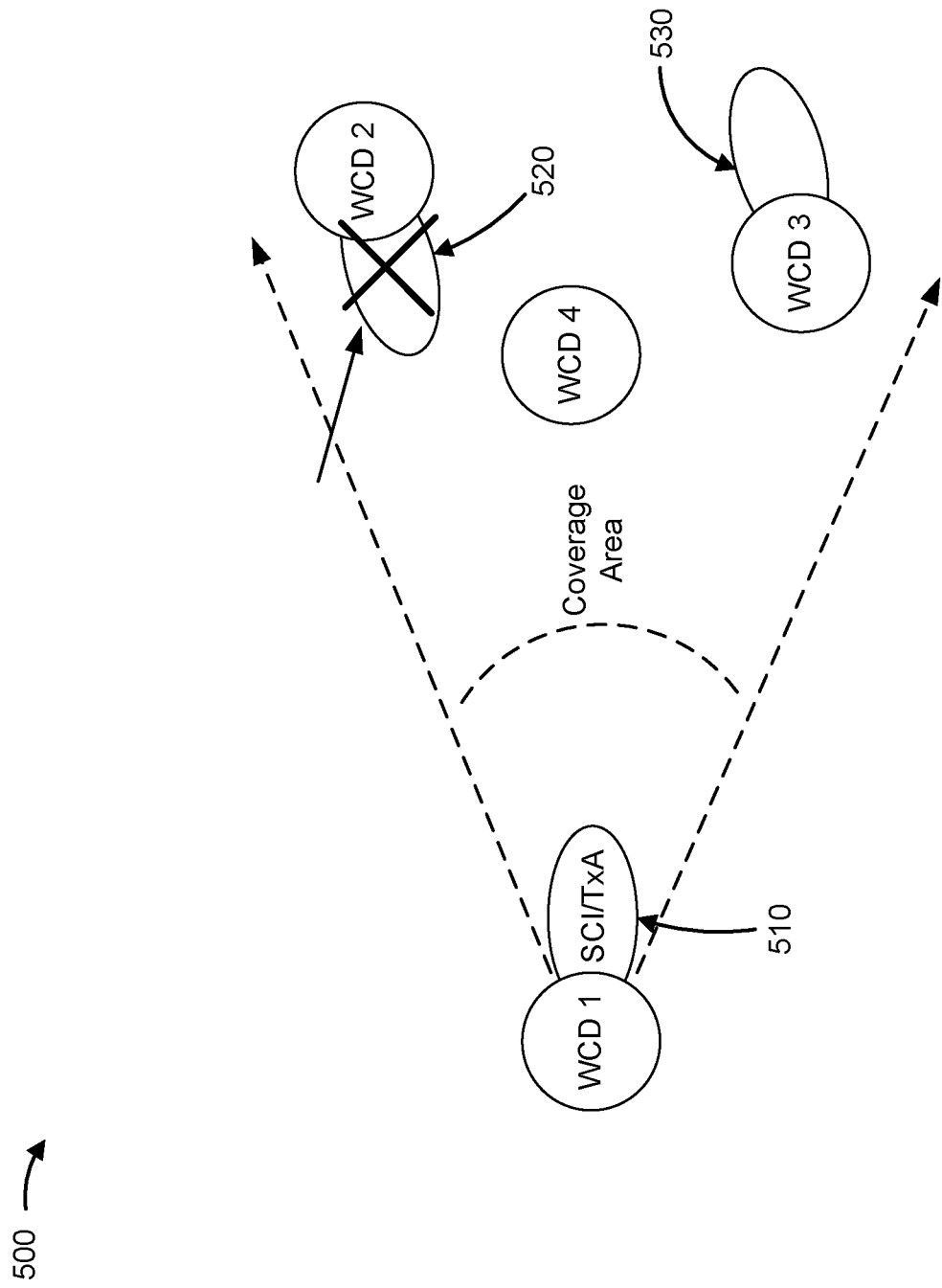
FIGS. 5 and 6 are diagrams illustrating examples of communications in a network, in accordance with various aspects of the present disclosure.

FIG. 5 is a diagram illustrating an example 500 of communications in a network, in accordance with various aspects of the present disclosure. As shown, a first wireless communication device (WCD 1), a second wireless communication device (WCD 2), a third wireless communication device (WCD 3), and a fourth wireless communication device (WCD 4) may communicate in a network. The network may be any type of network in which devices may communicate with other devices using beamforming techniques. For example, the network may be a millimeter wave network. In some cases, the network may be a sidelink network and/or an IAB network, among other examples. In some aspects, one or more of the WCDs may be, include, or be included in a UE, a base station, and/or an IAB node.

The WCD 1 may be scheduled to transmit a first future communication to WCD 4 using a beam 510. The beam 510 may include an expanding coverage area (e.g., beam width) indicated by the area inside the two dashed arrows in FIG. 5. A future communication is a communication that is to occur at some time in the future. Other WCDs may be scheduled to transmit and/or receive future communications using beams within the coverage area of the beam 510.

For example, as indicated in FIG. 5, the WCD 2 may intend to receive a second future communication. The WCD 2 and/or the device that is transmitting that second future communication to the WCD 2 may be configured to select resources to mitigate and/or minimize interference between the first and second future communications. To facilitate avoidance of interference, WCDs may transmit announcements that indicate future communications. In some aspects, announcements may include transmission (Tx) announcements (shown in FIG. 5 as "TxA") that indicate a future transmission of a communication and/or reception (Rx) announcements (shown in FIG. 6 as "RxA") that indicate a future reception of a communication. TxAs and RxAs may indicate the resources that will be used for the future communication.

For example, a transmission announcement may indicate a set of resources reserved for a future transmission of a communication. In some cases, a transmission announcement may be transmitted using a beam to be used to transmit the transmission that is indicated by the transmission announcement. In some cases, the transmission announcement may be transmitted using a beam that is wider than the beam to be used to transmit the transmission indicated by the transmission announcement. In this case, the transmission announcement may be used to facilitate preventing a WCD within the coverage area from using resources, in a direction overlapped by the coverage area, that overlap resources used by the WCD 1 to transmit the future communication. In some cases, the transmission announcement may be transmitted as part of SCI. A nearby WCD can receive the transmission announcement and, in response to receiving the transmission announcement, can select resources and/or beams that do not overlap those indicated in the announcement.

For example, as shown in FIG. 5, the WCD 2 may intend, at least initially, to transmit and/or receive a communication using the beam 520, which may have a coverage area that overlaps the coverage area of the beam 510. The WCD 2 may receive the transmission announcement and, in response to receiving the transmission announcement, may avoid communicating on the beam 520 (as indicated by the "X" over the beam 520). In some cases, the WCD 2 may avoid communicating using resources indicated in the transmission announcement.

In some cases, the WCD 2 may provide a resource recommendation to another WCD (e.g., WCD 3) that is based at least in part on the transmission announcement. For example, as shown in FIG. 5, the WCD 3 may be receiving using a beam 530 that is directed away from the beam 510 on which the transmission announcement is transmitted. As such, the WCD 3 may not receive the transmission announcement. However, the WCD 2 may transmit a resource recommendation to the WCD 3 that indicates the resource information provided in the transmission announcement and/or that suggests resources for the WCD 3 to use that avoid interference with the future communication.

In some cases, to facilitate reception of relevant transmission announcements, a WCD (e.g., WCD 2) may monitor for transmission announcements using a beam that the WCD intends to use to transmit or receive a communication. In some cases, to further facilitate avoidance of interference, a WCD that intends to receive a communication may monitor for transmission announcements. Similarly, a WCD that intends to transmit a communication may monitor for reception announcements.

As indicated above, FIG. 5 is provided as an example. Other examples may differ from what is described with respect to FIG. 5.

Figure 6:
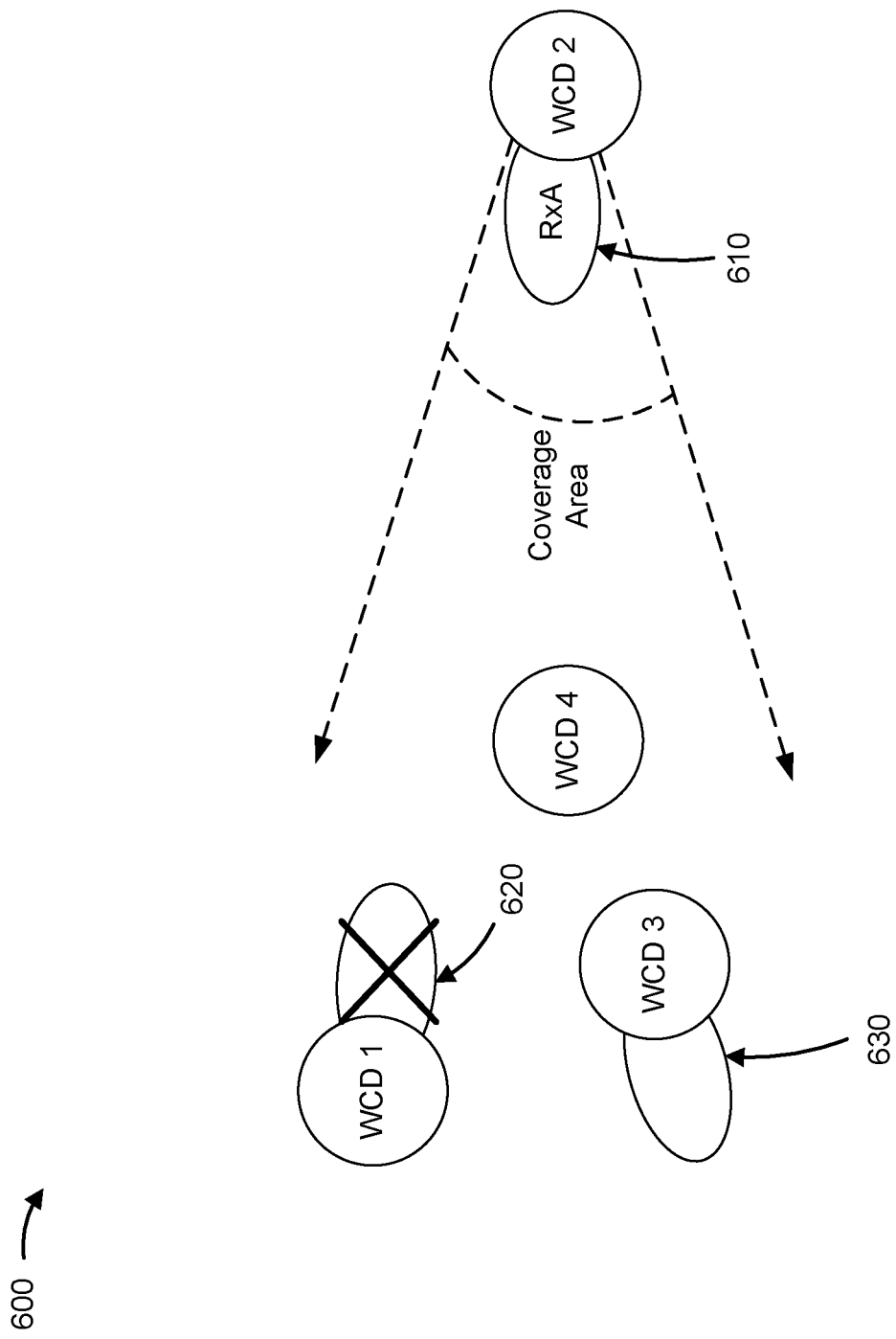

FIG. 6 is a diagram illustrating an example 600 of communications in a network, in accordance with various aspects of the present disclosure. As shown, a first wireless communication device (WCD 1), a second wireless communication device (WCD 2), a third wireless communication device (WCD 3), and a fourth wireless communication device (WCD 4) may communicate in a network. The network may be any type of network in which devices may communicate with other devices using beamforming techniques. For example, the network may be a millimeter wave network. In some cases, the network may be a sidelink network and/or an IAB network, among other examples. In some aspects, one or more of the WCDs may be, include, or be included in a UE, a base station, and/or an IAB node. In some cases, the WCDs may be the WCDs depicted in FIG. 5.

The WCD 2 may be scheduled to receive a first future communication from WCD 4 using a beam 610. The beam 610 may include an expanding coverage area (e.g., beam width) indicated by the area inside the two dashed arrows in FIG. 6. Other WCDs may be scheduled to transmit and/or receive future communications using beams within the coverage area of the beam 610.

For example, as indicated in FIG. 6, the WCD 1 may intend to transmit a second future communication. The WCD 1 and/or the device that is receiving that second future communication from the WCD 1 may be configured to select resources to mitigate and/or minimize interference between the first and second future communications. To facilitate avoidance of interference, WCDs may transmit announcements that indicate future communications. In some aspects, for example, a reception announcement (shown as "RxA") may indicate a set of resources reserved for a future reception of a communication. In some cases, a reception announcement may be transmitted using a beam to be used to receive the communication that is indicated by the reception announcement. In some cases, the reception announcement may be transmitted using a beam that is wider than the beam to be used to receive the communication indicated by the reception announcement. In this case, the reception announcement may be used to facilitate preventing a WCD within the coverage area from using resources, in a direction overlapped by the coverage area, that overlap resources used by the WCD 2 to receive the future communication. In some cases, the reception announcement may be transmitted as part of a PSFCH or similar channel. A nearby WCD can receive the reception announcement and, in response to receiving the reception announcement, can select resources and/or beams that do not overlap those indicated in the announcement.

For example, as shown in FIG. 6, the WCD 1 may intend, at least initially, to transmit and/or receive a communication using the beam 620, which may have a coverage area that overlaps the coverage area of the beam 610. The WCD 1 may receive the reception announcement and, in response to receiving the reception announcement, may avoid communicating on the beam 620 (as indicated by the "X" over the beam 620). In some cases, the WCD 1 may avoid communicating using resources indicated in the reception announcement.

In some cases, the WCD 2 may provide a resource recommendation to another WCD (e.g., WCD 3) that is based at least in part on the reception announcement. For example, as shown in FIG. 6, the WCD 3 may be receiving using a beam 630 that is directed away from the beam 610 on which the reception announcement is transmitted. As such, the WCD 3 may not receive the reception announcement. However, the WCD 1 may transmit a resource recommendation to the WCD 3 that indicates the resource information provided in the reception announcement and/or that suggests resources for the WCD 3 to use that avoid interference with the future communication. In some cases, to facilitate reception of relevant reception announcements, a WCD (e.g., WCD 1) may monitor for reception announcements using a beam that the WCD intends to use to transmit or receive a communication.

In some cases, a transmission announcement and/or reception announcement may not be received by WCDs that should receive them (e.g., WCDs that are scheduled to transmit and/or receive future communications that may interfere with a future communication transmitted and/or received by a WCD). Moreover, monitoring a channel for announcements may require a large number of resources, thus reducing the number of resources available for communicating with other devices. To facilitate monitoring for announcements while supporting communications between some devices, the network may be organized into an anchor-client network.

As indicated above, FIG. 6 is provided as an example. Other examples may differ from what is described with respect to FIG. 6.

Figure 7:
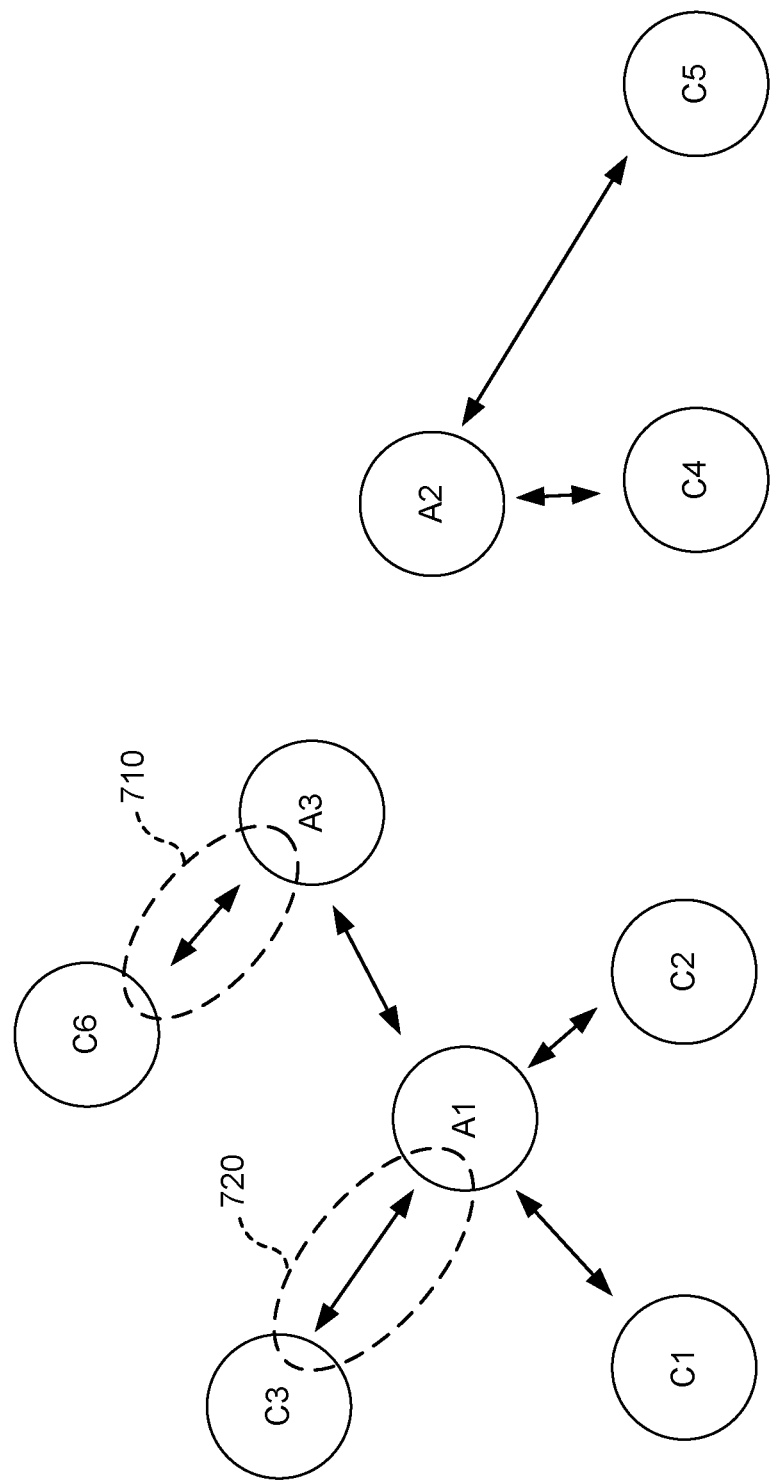
FIG. 7 is a diagram illustrating an example of communications in an anchor-client network, in accordance with various aspects of the present disclosure.

FIG. 7 is a diagram illustrating an example 700 of communications in an anchor-client network, in accordance with various aspects of the present disclosure. As shown, a first anchor device (A1), a second anchor device (A2), a third anchor device (A3), a first client device (C1), a second client device (C2), a third client device (C3), a fourth client device (C4), a fifth client device (C5), and a sixth client device (C6) may communicate in a network. The network may be any type of network in which devices may communicate with other devices using beamforming techniques. For example, the network may be a millimeter wave network. In some cases, the network may be a sidelink network and/or an IAB network, among other examples. In some aspects, one or more of the WCDs may be, include, or be included in a UE, a base station, and/or an IAB node.

As indicated above, the network may include anchor devices (A1, A2, and A3) and client devices (C1, C2, C3, C4, C5, and C6). In the context of the subject matter disclosed herein, anchor devices and client devices may be defined with respect to one another. For example, an anchor device may be a wireless communication device that communicates with one or more client devices and one or more other anchor devices. A client device is a wireless communication device that communicates only with an associated anchor device. Anchor devices and client devices may be the same types of devices (e.g., UEs, IAB nodes, and/or the like). An anchor-client relationship between an anchor device and an associated client device may be determined based at least in part on a network traffic condition. If a traffic condition changes, an anchor-client topology of the network also may change.

An anchor device may be aware of the resources being used by associated client devices to communicate but may not be aware of the resources being used by client devices that are associated with other anchor devices. A client device may be configured to monitor for announcements. Since a client device only communicates with its associated anchor device, the client device may have more resources available for monitoring for announcements. In some cases, an anchor device may monitor a channel for announcements, but this may reduce the number of resources available to the anchor device to communicate with other devices.

In some implementations, a client device may communicate with only one associated anchor device, which may facilitate leaving resources free for the client device to monitor for announcements. The anchor device may communicate with a number of associated client devices. A forward link is a communication link that supports a communication to be transmitted by an anchor device to an associated client device. A reverse link is a communication link that supports a communication to be transmitted by a client device to an associated anchor device.

For example, as shown in FIG. 7, A1 may communicate with associated client devices C1, C2, and/or C3, as well as with A3. A3 may communicate with associated client device C6, and A2 may communicate with associated client devices C4 and C5. Communications between anchor devices and their associated client devices may be impacted by other communications that cause interference due to using overlapping resources (e.g., time resources and/or frequency resources) and/or overlapping beams.

In FIG. 7, for example, A3 may be scheduled to engage in a first future communication 710 with C6, and A1 may be scheduled to engage in a second future communication 720 with C3. So that the first and second future communications 710 and 720 do not interfere with one another, the first and second future communications 710 and 720 may be implemented so that the resource set used for the first future communication 710 is orthogonal to the resource set used for the second future communication 720. A2 also may be scheduled to communicate with C4 and/or C5 and, as a result, it may be beneficial for A3 to take into account any resources used for those communications as well. However, monitoring available channels for announcements associated with the second future communication 720 may consume more resources than A3 is able to commit. Thus, announcements may be missed, thereby increasing the chance of interference occurring between the first and second future communications 710 and 720. As a result, network performance may be degraded, and resource consumption may be unnecessarily inefficient.

Some aspects of techniques and apparatuses described herein may provide dedicated resources for transmitting and/or receiving announcements. For example, in some aspects, a first wireless communication device (e.g., an anchor device) may transmit an anchor status notification associated with a first future communication between the first wireless communication device and a second wireless communication device. The anchor status notification may indicate to a receiving wireless communication device that the receiving wireless communication device is to transmit one or more announcements associated with a second future communication that the receiving device is scheduled to perform. In some aspects, the first wireless communication device may receive an announcement using at least one set of dedicated resources.

In this way, some aspects may facilitate providing dedicated resources for receiving announcements. As the wireless communication devices can be informed of the dedicated resources, announcements may be transmitted and received without requiring extensive monitoring and/or resource consumption. In some aspects, a client device may monitor a set of dedicated resources for announcements and/or may transmit an announcement, using another set of dedicated resources, on behalf of an associated anchor. As a result, some aspects disclosed herein may facilitate efficient use of resources and/or increased network performance.

As indicated above, FIG. 7 is provided as an example. Other examples may differ from what is described with respect to FIG. 7.

Figure 8:
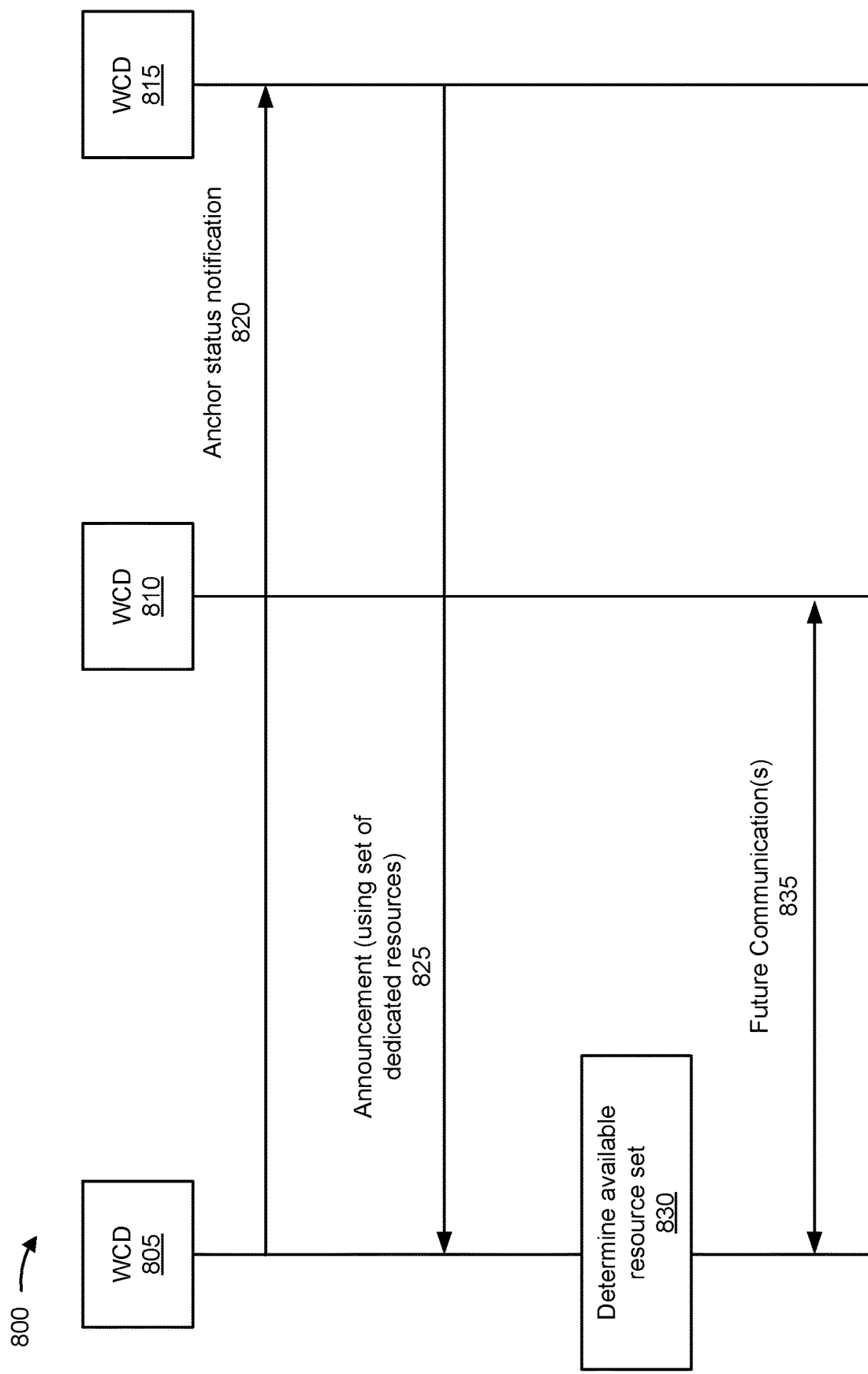
FIGS. 8-11 are diagrams illustrating examples associated with resource selection in an anchor-client network, in accordance with various aspects of the present disclosure.

FIG. 8 is a diagram illustrating an example 800 associated with resource selection in an anchor-client network, in accordance with various aspects of the present disclosure. As shown, a first WCD 805, a second WCD 810, and a third WCD 815 may communicate in a network. The network may be any type of network in which devices may communicate with other devices using beamforming techniques. For example, the network may be a millimeter wave network. In some cases, the network may be a sidelink network and/or an IAB network, among other examples. In some aspects, one or more of the WCDs 805, 810, and 815 may be, include, or be included in a UE, a base station, and/or an IAB node. In some aspects, the WCD 805 and the WCD 815 may include anchor devices, and the WCD 810 may include a client device (e.g., a client device corresponding to the WCD 805). In some aspects, the WCD 815 may include a client device corresponding to another anchor device.

As shown by reference number 820, the WCD 805 may transmit, and the WCD 815 may receive, an anchor status notification. The anchor status notification may be associated with a first future communication between the WCD 805 and the WCD 810. In some aspects, for example, the WCD 805 may be an anchor device and the WCD 810 may be an associated client device. In some aspects, the WCD 805 and the WCD 810 may both be anchor devices. The WCD 805 may transmit the anchor status notification using a beam to be used for the first future communication. In some aspects, the WCD 805 may transmit the anchor status notification using a set of dedicated resources.

As shown by reference number 825, the WCD 815 may transmit, and the WCD 805 may receive, at least one announcement. The at least one announcement may be transmitted using at least one set of dedicated resources. In some aspects, the WCD 805 may receive the at least one announcement from one or more other devices. In some aspects, the at least one announcement indicates at least one second future communication associated with the WCD 815. In some aspects, the at least one set of dedicated resources corresponds to the set of dedicated resources used for transmitting the anchor status notification. For example, a first slot may be dedicated for transmission of an anchor status notification and a second slot, separated by a specified offset, may be dedicated to transmission of one or more announcements in response to the anchor status notification. In some aspects, these pairs of dedicated slots (and/or other resource allocations such as, e.g., frequencies, subchannels, resource blocks, and/or resource elements) may be periodic, dynamic, and/or a combination thereof. In some aspects, the at least one announcement may include resource reservation information corresponding to a beam. Resource reservation information may be information that indicates one or more reserved resources.

In some aspects, the WCD 805 may include a first anchor device and may receive an additional anchor status notification from a second anchor, which may be the WCD 810. The WCD 805 may select the beam from a plurality of beams based at least in part on the additional anchor status notification.

As shown by reference number 830, the WCD 805 may determine an available resource set. The WCD 805 may determine the available resource set based at least in part on the at least one announcement. In some aspects, the WCD 805 may determine the available resource set based at least in part on a resource recommendation received from the WCD 810. As shown by reference number 835, the WCD 805 and the WCD 810 may communicate using the available resource set. In some aspects, the WCD 805 may communicate with the WCD 810 using the beam that was used to transmit the anchor status notification and/or receive the at least one announcement.

In some aspects, dedicated resources may be assigned to anchors. For example, in some aspects, a first set of dedicated resources for transmitting an anchor status notification and a second, corresponding set of dedicated resources for receiving announcements may be assigned to a first anchor. A third set of dedicated resources for transmitting an anchor status notification and a fourth, corresponding set of dedicated resources for receiving announcements may be assigned to a second anchor. The assignment of resources may be based on the anchors so that only the first anchor uses the first set of dedicated resources, only the second anchor uses the third set of dedicated resources, and so on. In some aspects, assignment of dedicated sets of resources may be based at least in part on geographic locations of anchors. For example, anchors within a first geographic zone (e.g., a sidelink zone) may be assigned a first set of dedicated resources, anchors within a second geographic zone may be assigned a second set of dedicated resources, and so on.

As indicated above, FIG. 8 is provided as an example. Other examples may differ from what is described with respect to FIG. 8.

Figure 9:
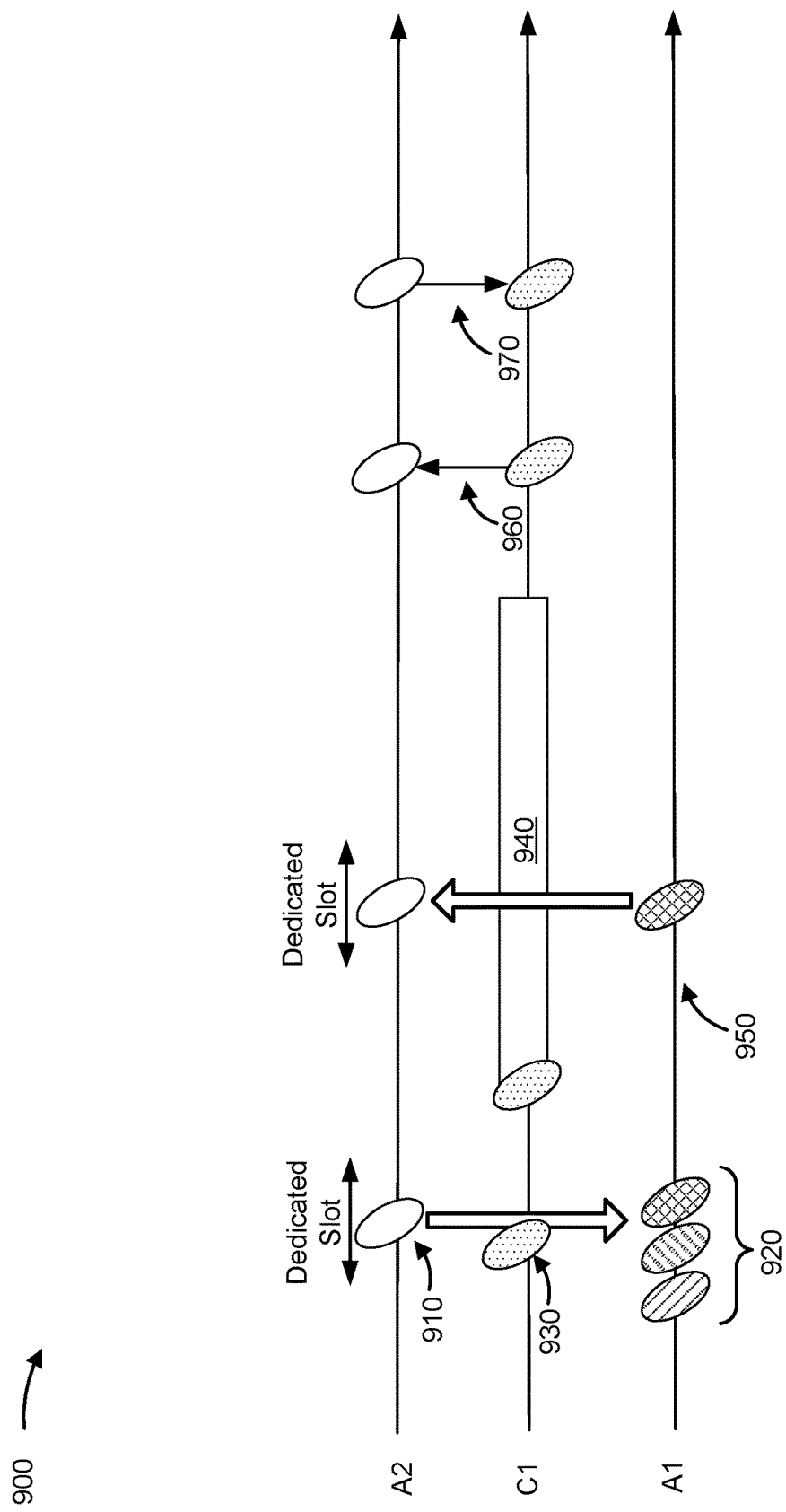

FIG. 9 is a diagram illustrating an example 900 associated with resource selection for an anchor device to client device transmission in an anchor-client network, in accordance with various aspects of the present disclosure. As shown, a first anchor device (A1), and a second anchor device (A2) and a client device (C1) associated with A2, may communicate in a network. In some aspects, for example, A1 may be, or be similar to, WCD 815 shown in FIG. 8; A2 may be, or be similar to WCD 805 shown in FIG. 8; and C1 may be, or be similar to, WCD 810 shown in FIG. 8.

As shown by reference number 910, A2 may transmit, in a dedicated slot, an anchor status notification that indicates a future transmission by A2 to C1. As shown by reference number 920, A1 may receive the anchor status notification. A1 may receive the anchor status notification using more than one beam. For example, in the illustrated example, A1 receives the anchor status notification using three beams. Each of the three beams may be a beam that A1 is using, or will use, to communicate with a different client associated with A1. As shown by reference number 930, C1 also may receive the anchor status indication. In some aspects, as shown by reference number 940, C1 may begin monitoring the communication channel using the beam on which C1 received the anchor status indication. This beam also may be the beam C1 uses to receive transmissions from A2. C1 may monitor for announcements from nearby WCDs.

As shown by reference number 950, A1 may transmit an announcement (e.g., a reception announcement or a transmission announcement) to A2 using a beam on which A1 received the anchor status notification. A1 may transmit the announcement based at least in part on receiving the anchor status notification. The announcement may indicate a future communication associated with the beam on which A1 received the anchor status notification. For example, the announcement may indicate a set of resources that are reserved for a future communication that will use the beam on which A1 received the anchor status notification. As shown by reference number 960, C1 may transmit a resource recommendation to A2. The resource recommendation may indicate a set of recommended resources for use in communicating with C1. C1 may generate the resource recommendation based at least in part on monitoring the channel. For example, C1 may recommend resources that are not indicated by announcements that C1 receives while monitoring the channel.

As shown by reference number 970, A2 may transmit a data channel transmission to C1 using a selected set of resources. The selected set of resources may be based at least in part on the resource recommendation.

As indicated above, FIG. 9 is provided as an example. Other examples may differ from what is described with respect to FIG. 9.

Figure 10:
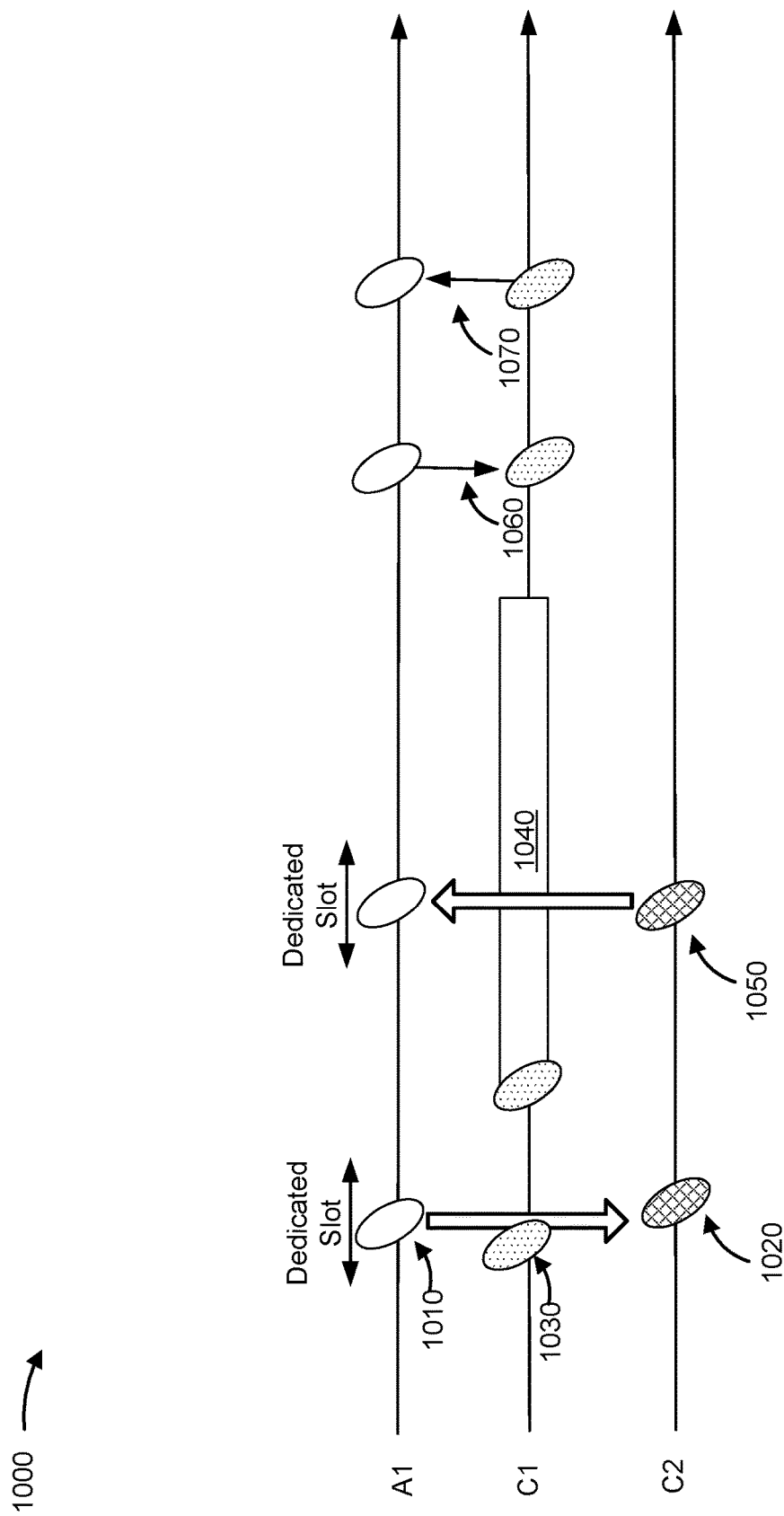

FIG. 10 is a diagram illustrating an example 1000 associated with resource selection for a client device to anchor device transmission in an anchor-client network, in accordance with various aspects of the present disclosure. As shown, a first anchor device (A1), a first client device (C1) associated with A1, and a second client device (C2) associated with another anchor device (not illustrated) may communicate in a network. In some aspects, for example, A1 may be, or be similar to, WCD 805 shown in FIG. 8; and C1 may be, or be similar to WCD 810 shown in FIG. 8; and C2 may be, or be similar to WCD 815.

As shown by reference number 1010, A1 may transmit, in a dedicated slot, an anchor status notification that indicates a future reception by A1 from C1. As shown by reference number 1020, C2 may receive the anchor status notification. In some aspects, C2 may receive the anchor status notification using one beam. As shown by reference number 1030, C1 also may receive the anchor status indication. In some aspects, as shown by reference number 1040, C1 may begin monitoring the communication channel using the beam on which C1 received the anchor status indication. This beam also may be the beam C1 uses to transmit transmissions to A1. C1 may monitor for announcements from nearby WCDs.

As shown by reference number 1050, C2 may transmit an announcement (e.g., a reception announcement or a transmission announcement) to A1 using a beam on which C2 received the anchor status notification. For example, the announcement may include a transmission announcement indicating a set of resources that C2 is using, or will use, to transmit a transmission to the anchor device associated with C2. As shown by reference number 1060, A1 may transmit a resource recommendation to C1. The resource recommendation may indicate a set of recommended resources for use by C1 in transmitting to A1. A1 may generate the resource recommendation based at least in part on the announcement received from C2. As shown by reference number 1070, C1 may transmit a data channel transmission to A1 using a selected set of resources. The selected set of resources may be based at least in part on the resource recommendation and/or the monitoring of the channel performed by C1.

As indicated above, FIG. 10 is provided as an example. Other examples may differ from what is described with respect to FIG. 10.

Figure 11:
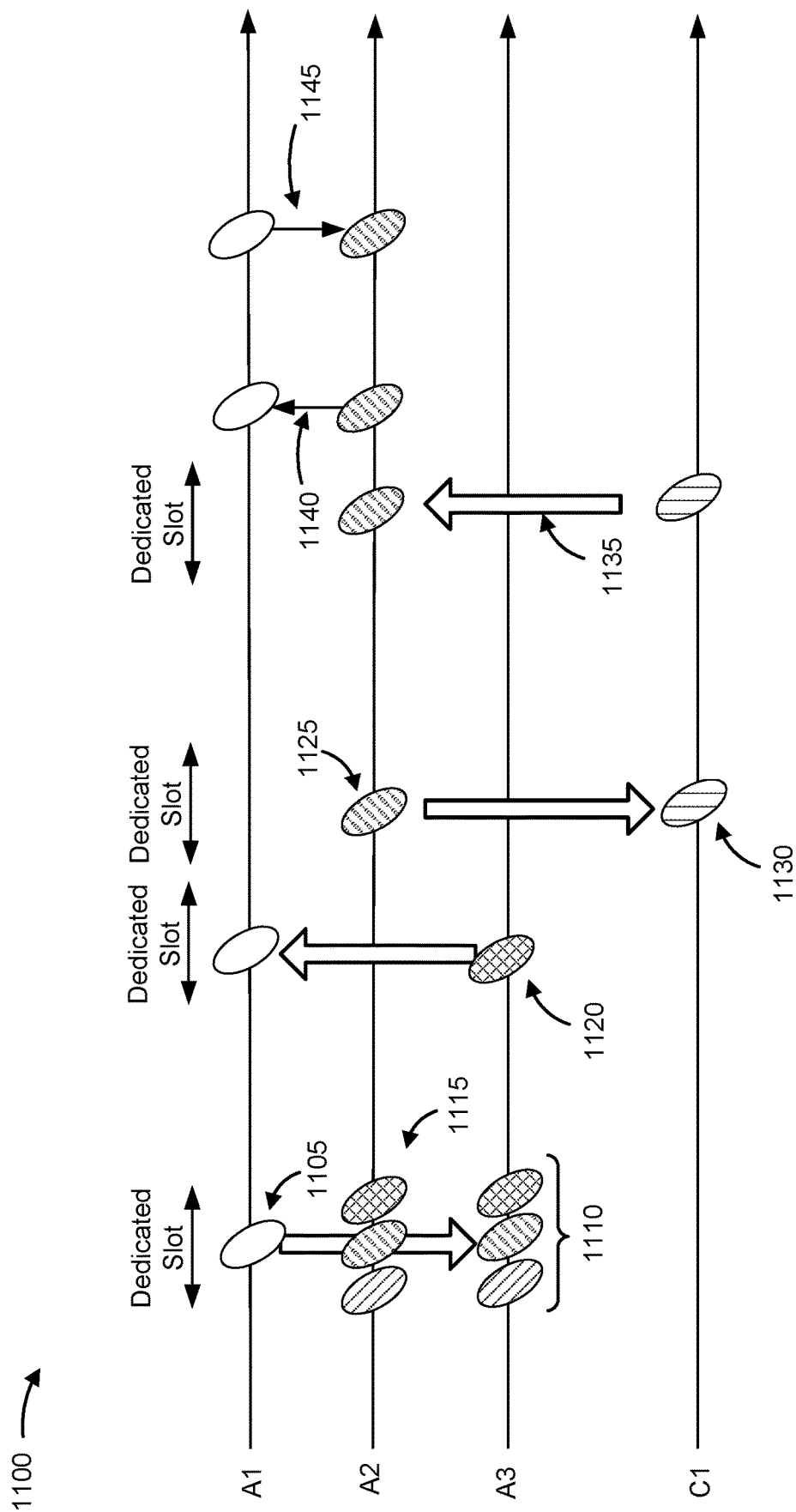

FIG. 11 is a diagram illustrating an example 1100 associated with resource selection for an anchor device to anchor device transmission in an anchor-client network, in accordance with various aspects of the present disclosure. As shown, a first anchor device (A1), a second anchor device (A2), a third anchor device (A3), and a first client device (C1) may communicate in a network. C1 may be associated with A3 or another anchor device not illustrated. In some aspects, for example, A1 may be, or be similar to, WCD 805 shown in FIG. 8; A2 may be, or be similar to, WCD 815 shown in FIG. 8; and C1 may be, or be similar to, WCD 810 shown in FIG. 8; and A3 may be, or be similar to, WCD 810 shown in FIG. 8.

As shown by reference number 1105, A1 may transmit, in a dedicated slot, an anchor status notification that indicates a future transmission by A1 to A2. As shown by reference number 1110, A3 may receive the anchor status notification. In some aspects, as shown, A3 may receive the anchor status notification using more than one beam. As shown by reference number 1115, A2 also may receive the anchor status indication.

As shown by reference number 1120, A3 may transmit, during a dedicated slot, an announcement (e.g., a reception announcement or a transmission announcement) to A1 using a beam on which A3 received the anchor status notification. For example, the announcement may include a transmission announcement indicating a set of resources that A3 is using, or will use, to transmit a transmission to a client device associated with A3, where that transmission will be transmitted using the beam that A3 used to receive the anchor status indication 1105.

Based at least in part on the anchor status indication, A2 may determine the beam with which A2 will receive the future transmission from A1. Using the determined beam, as shown by reference number 1125, A2 may transmit an anchor status notification indicating the future reception from A1. As shown by reference number 1130, C1 may receive the anchor status notification from A2. As shown by reference number 1135, C1 may transmit an announcement (e.g., a reception announcement or a transmission announcement) to A2.

As shown by reference number 1140, A2 may transmit a resource recommendation to A1. The resource recommendation may indicate a set of recommended resources for use by A1 in transmitting to A2. A2 may generate the resource recommendation based at least in part on the announcement received from C1. As shown by reference number 1145, A1 may transmit a data channel transmission to A2 using a selected set of resources. The selected set of resources may be based at least in part on the resource recommendation 1140 and/or the announcement 1120 from A3.

As indicated above, FIG. 11 is provided as an example. Other examples may differ from what is described with respect to FIG. 11.

Figure 12:
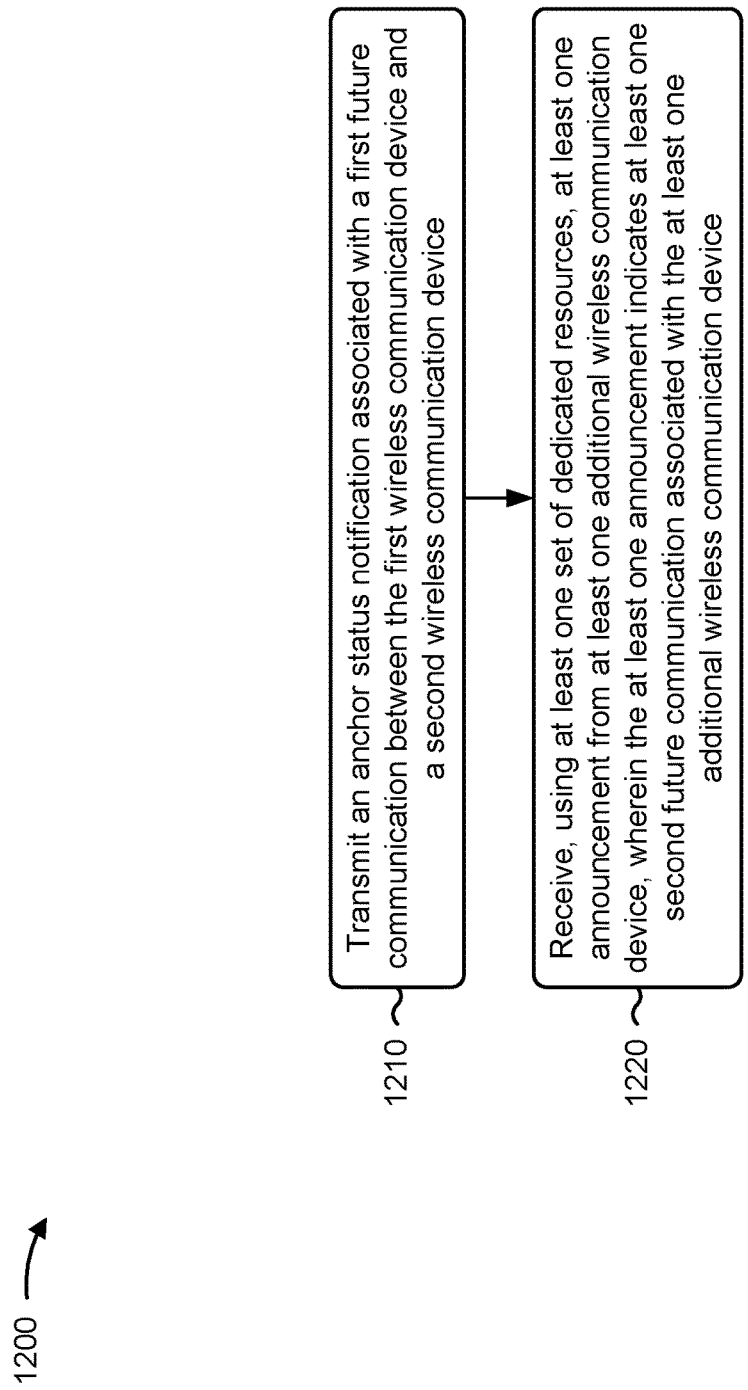
FIGS. 12-15 are diagrams illustrating example processes associated with resource selection in an anchor-client network, in accordance with various aspects of the present disclosure.

FIG. 12 is a diagram illustrating an example process 1200 performed, for example, by a first wireless communication device, in accordance with various aspects of the present disclosure. Example process 1200 is an example where the first wireless communication device (e.g., the WCD 805 shown in FIG. 8) performs operations associated with resource selection in an anchor-client network.

As shown in FIG. 12, in some aspects, process 1200 may include transmitting an anchor status notification associated with a first future communication between the first wireless communication device and a second wireless communication device (block 1210). For example, the first wireless communication device (e.g., using transmission component 1604, depicted in FIG. 16) may transmit an anchor status notification associated with a first future communication between the first wireless communication device and a second wireless communication device, as described above.

As further shown in FIG. 12, in some aspects, process 1200 may include receiving, using at least one set of dedicated resources, at least one announcement from at least one additional wireless communication device, wherein the at least one announcement indicates at least one second future communication associated with the at least one additional wireless communication device (block 1220). For example, the first wireless communication device (e.g., using reception component 1602, depicted in FIG. 16) may receive, using at least one set of dedicated resources, at least one announcement from at least one additional wireless communication device, wherein the at least one announcement indicates at least one second future communication associated with the at least one additional wireless communication device, as described above.

Process 1200 may include additional aspects, such as any single aspect or any combination of aspects described below and/or in connection with one or more other processes described elsewhere herein.

In a first aspect, the at least one additional communication device comprises an anchor device.

In a second aspect, alone or in combination with the first aspect, the first wireless communication device comprises a first anchor device, and the at least one additional communication device comprises a client device associated with a second anchor device.

In a third aspect, alone or in combination with one or more of the first and second aspects, process 1200 includes determining an available resource set based at least in part on the at least one announcement, and communicating with the second wireless communication device using the available resource set.

In a fourth aspect, alone or in combination with one or more of the first through third aspects, transmitting the anchor status notification comprises transmitting the anchor status notification using a beam to be used for the first future communication.

In a fifth aspect, alone or in combination with one or more of the first through fourth aspects, process 1200 includes communicating with the second wireless communication device using the beam.

In a sixth aspect, alone or in combination with one or more of the first through fifth aspects, the at least one announcement comprises resource reservation information corresponding to the beam.

In a seventh aspect, alone or in combination with one or more of the first through sixth aspects, the wireless communication device comprises a first anchor, and process 1200 includes receiving an additional anchor status notification from a second anchor, and selecting the beam from a plurality of beams based at least in part on the additional anchor status notification.

In an eighth aspect, alone or in combination with one or more of the first through seventh aspects, process 1200 includes receiving, from the second wireless communication device, a resource recommendation that indicates a recommended set of resources for the first future communication.

In a ninth aspect, alone or in combination with one or more of the first through eighth aspects, process 1200 includes transmitting, to the second wireless communication device, a resource recommendation that indicates a recommended set of resources for the first future communication.

In a tenth aspect, alone or in combination with one or more of the first through ninth aspects, transmitting the anchor status notification comprises transmitting the anchor status notification using at least one additional set of dedicated resources.

In an eleventh aspect, alone or in combination with one or more of the first through tenth aspects, the at least one set of dedicated resources corresponds to the at least one additional set of dedicated resources.

In a twelfth aspect, alone or in combination with one or more of the first through eleventh aspects, the first wireless communication device comprises a user equipment, and transmitting the anchor status notification comprises transmitting the anchor status notification on a sidelink network.

In a thirteenth aspect, alone or in combination with one or more of the first through twelfth aspects, the first wireless communication device comprises an IAB node, and transmitting the anchor status notification comprises transmitting the anchor status notification on an IAB network.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
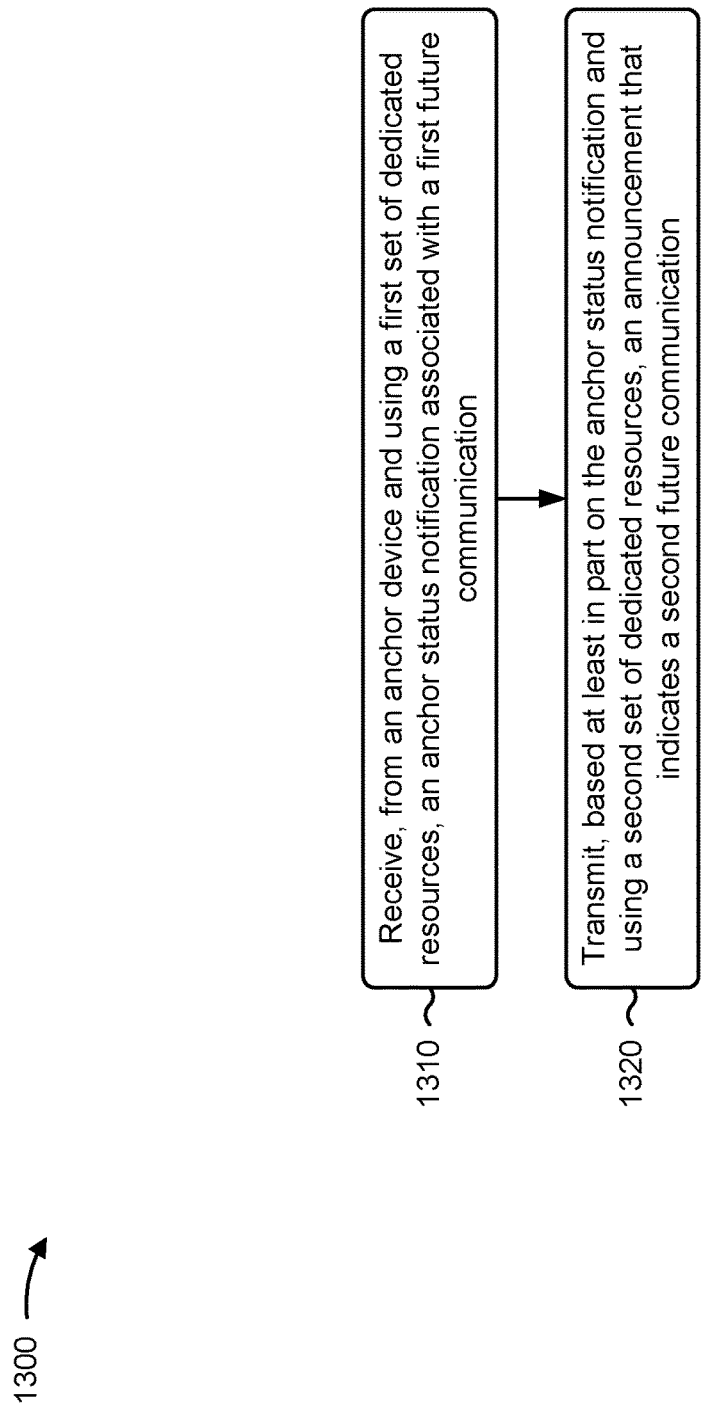

FIG. 13 is a diagram illustrating an example process 1300 performed, for example, by a wireless communication device, in accordance with various aspects of the present disclosure. Example process 1300 is an example where the wireless communication device (e.g., WCD 810) performs operations associated with resource selection in an anchor-client network.

As shown in FIG. 13, in some aspects, process 1300 may include receiving, from an anchor device and using a first set of dedicated resources, an anchor status notification associated with a first future communication (block 1310). For example, the wireless communication device (e.g., using reception component 1602, depicted in FIG. 16) may receive, from an anchor device and using a first set of dedicated resources, an anchor status notification associated with a first future communication, as described above.

As further shown in FIG. 13, in some aspects, process 1300 may include transmitting, based at least in part on the anchor status notification and using a second set of dedicated resources, an announcement that indicates a second future communication (block 1320). For example, the wireless communication device (e.g., using transmission component 1604, depicted in FIG. 16) may transmit, based at least in part on the anchor status notification and using a second set of dedicated resources, an announcement that indicates a second future communication, as described above.

Process 1300 may include additional aspects, such as any single aspect or any combination of aspects described below and/or in connection with one or more other processes described elsewhere herein.

In a first aspect, receiving the anchor status notification comprises receiving the anchor status notification using a beam.

In a second aspect, alone or in combination with the first aspect, the second future communication corresponds to the beam.

In a third aspect, alone or in combination with one or more of the first and second aspects, the announcement comprises resource reservation information corresponding to the beam.

In a fourth aspect, alone or in combination with one or more of the first through third aspects, the second future communication is associated with an additional wireless communication device.

In a fifth aspect, alone or in combination with one or more of the first through fourth aspects, the second set of dedicated resources corresponds to the first set of dedicated resources.

In a sixth aspect, alone or in combination with one or more of the first through fifth aspects, the wireless communication device comprises a user equipment, and transmitting the announcement comprises transmitting the announcement on a sidelink network.

In a seventh aspect, alone or in combination with one or more of the first through sixth aspects, the wireless communication device comprises an IAB node, and transmitting the announcement comprises transmitting the announcement on an IAB network.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
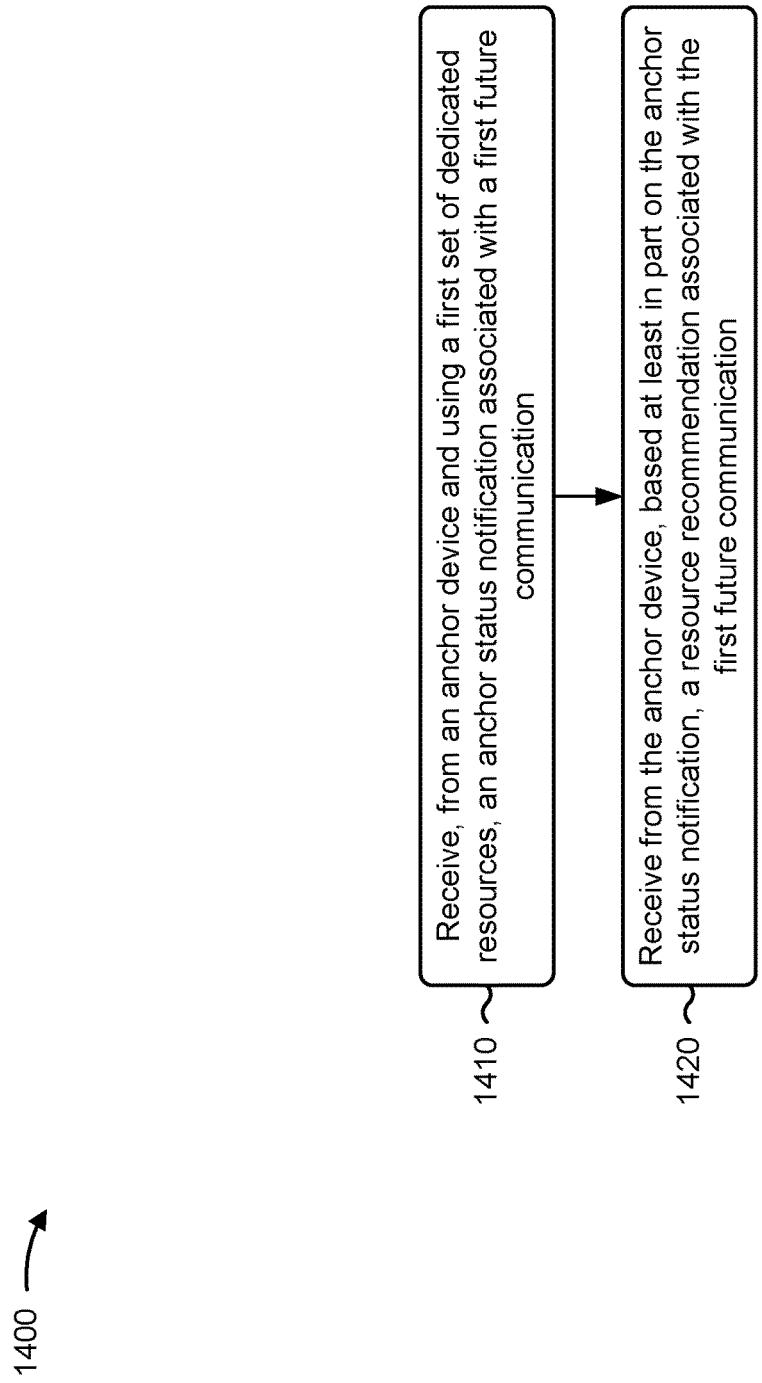

FIG. 14 is a diagram illustrating an example process 1400 performed, for example, by a wireless communication device, in accordance with various aspects of the present disclosure. Example process 1400 is an example where the wireless communication device (e.g., WCD 815 shown in FIG. 8) performs operations associated with resource selection in an anchor-client network.

As shown in FIG. 14, in some aspects, process 1400 may include receiving, from an anchor device and using a first set of dedicated resources, an anchor status notification associated with a first future communication (block 1410). For example, the wireless communication device (e.g., using reception component 1602, depicted in FIG. 16) may receive, from an anchor device and using a first set of dedicated resources, an anchor status notification associated with a first future communication, as described above.

As further shown in FIG. 14, in some aspects, process 1400 may include receiving from the anchor device, based at least in part on the anchor status notification, a resource recommendation associated with the first future communication (block 1420). For example, the wireless communication device (e.g., using reception component 1602, depicted in FIG. 16) may receive from the anchor device, based at least in part on the anchor status notification, a resource recommendation associated with the first future communication, as described above.

Process 1400 may include additional aspects, such as any single aspect or any combination of aspects described below and/or in connection with one or more other processes described elsewhere herein.

In a first aspect, process 1400 includes transmitting the first future communication to the anchor device using a selected set of resources, wherein the selected set of resources is based at least in part on the resource recommendation.

In a second aspect, alone or in combination with the first aspect, process 1400 includes selecting the selected set of resources based at least in part on the resource recommendation.

In a third aspect, alone or in combination with one or more of the first and second aspects, process 1400 includes receiving, from an additional wireless communication device, an announcement that indicates a second future communication, wherein selecting the selected set of resources comprises selecting the selected set of resources based at least in part on the announcement.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
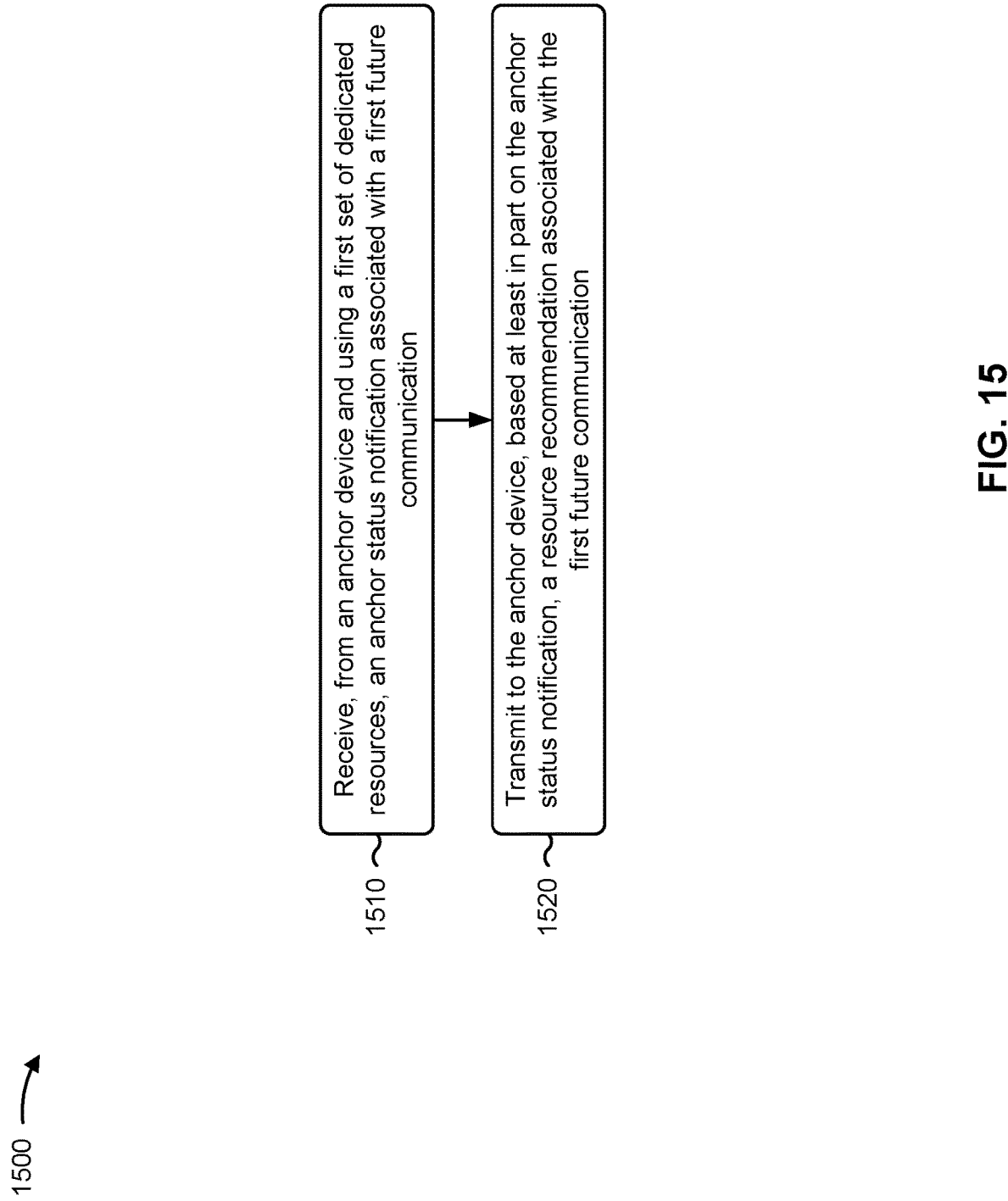

FIG. 15 is a diagram illustrating an example process 1500 performed, for example, by a wireless communication device, in accordance with various aspects of the present disclosure. Example process 1500 is an example where the wireless communication device (e.g., WCD 815 shown in FIG. 8) performs operations associated with resource selection in an anchor-client network.

As shown in FIG. 15, in some aspects, process 1500 may include receiving, from an anchor device and using a first set of dedicated resources, an anchor status notification associated with a first future communication (block 1510). For example, the wireless communication device (e.g., using reception component 1602, depicted in FIG. 16) may receive, from an anchor device and using a first set of dedicated resources, an anchor status notification associated with a first future communication, as described above.

As further shown in FIG. 15, in some aspects, process 1500 may include transmitting to the anchor device, based at least in part on the anchor status notification, a resource recommendation associated with the first future communication (block 1520). For example, the wireless communication device (e.g., using transmission component 1604, depicted in FIG. 16) may transmit to the anchor device, based at least in part on the anchor status notification, a resource recommendation associated with the first future communication, as described above.

Process 1500 may include additional aspects, such as any single aspect or any combination of aspects described below and/or in connection with one or more other processes described elsewhere herein.

In a first aspect, process 1500 includes transmitting an additional anchor status notification associated with the first future communication.

In a second aspect, alone or in combination with the first aspect, receiving the anchor status notification comprises receiving the anchor status notification using a beam, and transmitting the additional anchor status notification comprises transmitting the additional anchor status notification using the beam.

In a third aspect, alone or in combination with one or more of the first and second aspects, process 1500 includes receiving, from an additional wireless communication device, an announcement that indicates a second future communication, wherein the resource recommendation is based at least in part on the announcement.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
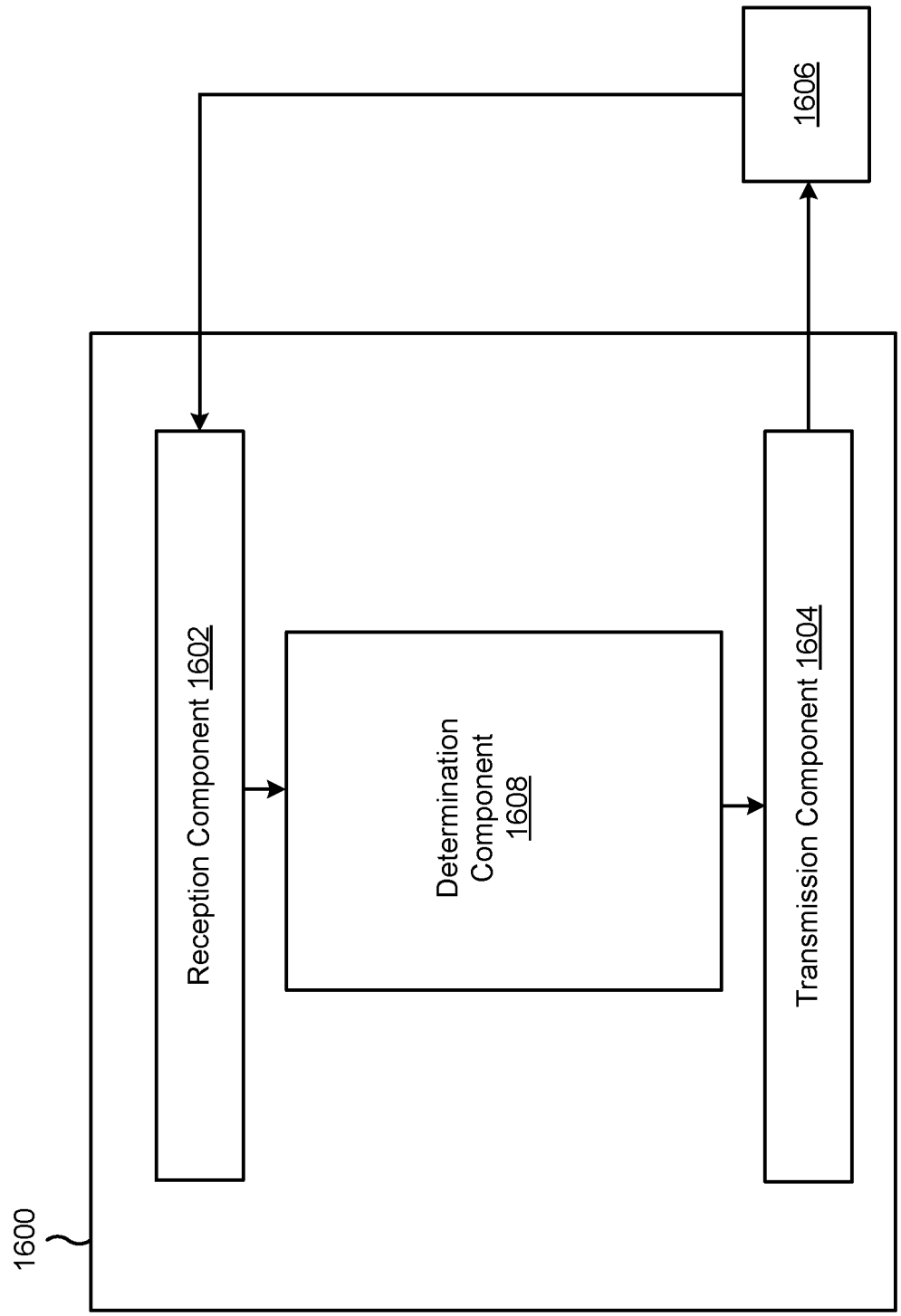
FIG. 16 is a block diagram of an example apparatus for wireless communication, in accordance with various aspects of the present disclosure.

FIG. 16 is a block diagram of an example apparatus 1600 for wireless communication. The apparatus 1600 may be a wireless communication device, or a wireless communication device may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a determination component 1608.

In some aspects, the apparatus 1600 may be configured to perform one or more operations described herein in connection with FIGS. 8-11. Additionally, or alternatively, the apparatus 1600 may be configured to perform one or more processes described herein, such as process 1200 of FIG. 12, process 1300 of FIG. 13, process 1400 of FIG. 14, process 1500 of FIG. 15, or a combination thereof. In some aspects, the apparatus 1600 and/or one or more components shown in FIG. 16 may include one or more components of the UE and/or the base station described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE and/or the base station described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE and/or the base station described above in connection with FIG. 2. In some aspects, the transmission component 1604 may be co-located with the reception component 1602 in a transceiver.

The transmission component 1604 may transmit an anchor status notification associated with a first future communication between the first wireless communication device and a second wireless communication device. The reception component 1602 may receive, using at least one set of dedicated resources, at least one announcement from at least one additional wireless communication device, wherein the at least one announcement indicates at least one second future communication associated with the at least one additional wireless communication device.

The determination component 1608 may determine an available resource set based at least in part on the at least one announcement. In some aspects, the determination component 1608 may include one or more antennas, a modulator, a transmit MIMO processor, a transmit processor, a controller/processor, a memory, or a combination thereof, of the UE and/or the base station described above in connection with FIG. 2. In some aspects, the determination component 1608 may include the reception component 1602 and/or the transmission component 1604.

The reception component 1602 and/or the transmission component 1604 may communicate with the second wireless communication device using the available resource set. The reception component 1602 may receive, from the second wireless communication device, a resource recommendation that indicates a recommended set of resources for the first future communication. The transmission component 1604 may transmit, to the second wireless communication device, a resource recommendation that indicates a recommended set of resources for the first future communication.

The reception component 1602 may receive, from an anchor device and using a first set of dedicated resources, an anchor status notification associated with a first future communication. The transmission component 1604 may transmit, based at least in part on the anchor status notification and using a second set of dedicated resources, an announcement that indicates a second future communication.

The reception component 1602 may receive, from an anchor device and using a first set of dedicated resources, an anchor status notification associated with a first future communication. The reception component 1602 may receive from the anchor device, based at least in part on the anchor status notification, a resource recommendation associated with the first future communication.

The transmission component 1604 may transmit the first future communication to the anchor device using a selected set of resources, wherein the selected set of resources is based at least in part on the resource recommendation.

The determination component 1608 may select the selected set of resources based at least in part on the resource recommendation.

The reception component 1602 may receive, from an additional wireless communication device, an announcement that indicates a second future communication, wherein selecting the selected set of resources comprises selecting the selected set of resources based at least in part on the announcement.

The reception component 1602 may receive, from an anchor device and using a first set of dedicated resources, an anchor status notification associated with a first future communication. The transmission component 1604 may transmit to the anchor device, based at least in part on the anchor status notification, a resource recommendation associated with the first future communication.

The transmission component 1604 may transmit an additional anchor status notification associated with the first future communication.

The reception component 1602 may receive, from an additional wireless communication device, an announcement that indicates a second future communication wherein the resource recommendation is based at least in part on the announcement.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some aspects of the present disclosure:

Aspect 1: A method of wireless communication performed by a first wireless communication device, comprising: transmitting an anchor status notification associated with a first future communication between the first wireless communication device and a second wireless communication device; and receiving, using at least one set of dedicated resources, at least one announcement from at least one additional wireless communication device, wherein the at least one announcement indicates at least one second future communication associated with the at least one additional wireless communication device.

Aspect 2: The method of aspect 1, wherein the at least one additional communication device comprises an anchor device.

Aspect 3: The method of aspect 1, wherein the first wireless communication device comprises a first anchor device, and wherein the at least one additional communication device comprises a client device associated with a second anchor device.

Aspect 4: The method of any of aspects 1-3, further comprising: determining an available resource set based at least in part on the at least one announcement; and communicating with the second wireless communication device using the available resource set.

Aspect 5: The method of any of aspects 1-4, wherein transmitting the anchor status notification comprises transmitting the anchor status notification using a beam to be used for the first future communication.

Aspect 6: The method of aspect 5, further comprising communicating with the second wireless communication device using the beam.

Aspect 7: The method of either of aspects 5 or 6, wherein the at least one announcement comprises resource reservation information corresponding to the beam.

Aspect 8: The method of any of aspects 5-7, wherein the wireless communication device comprises a first anchor, the method further comprising: receiving an additional anchor status notification from a second anchor; and selecting the beam from a plurality of beams based at least in part on the additional anchor status notification.

Aspect 9: The method of any of aspects 1-8, further comprising receiving, from the second wireless communication device, a resource recommendation that indicates a recommended set of resources for the first future communication.

Aspect 10: The method of any of aspects 1-8, further comprising transmitting, to the second wireless communication device, a resource recommendation that indicates a recommended set of resources for the first future communication.

Aspect 11: The method of any of aspects 1-10, wherein transmitting the anchor status notification comprises transmitting the anchor status notification using at least one additional set of dedicated resources.

Aspect 12: The method of aspect 11, wherein the at least one set of dedicated resources corresponds to the at least one additional set of dedicated resources.

Aspect 13: The method of any of aspects 1-12, wherein the first wireless communication device comprises a user equipment, and wherein transmitting the anchor status notification comprises transmitting the anchor status notification on a sidelink network.

Aspect 14: The method of any of aspects 1-12, wherein the first wireless communication device comprises an integrated access and backhaul (IAB) node, and wherein transmitting the anchor status notification comprises transmitting the anchor status notification on an TAB network.

Aspect 15: A method of wireless communication performed by a wireless communication device, comprising: receiving, from an anchor device and using a first set of dedicated resources, an anchor status notification associated with a first future communication; and transmitting, based at least in part on the anchor status notification and using a second set of dedicated resources, an announcement that indicates a second future communication.

Aspect 16: The method of aspect 15, wherein receiving the anchor status notification comprises receiving the anchor status notification using a beam.

Aspect 17: The method of aspect 16, wherein the second future communication corresponds to the beam.

Aspect 18: The method of either of aspects 16 or 17, wherein the announcement comprises resource reservation information corresponding to the beam.

Aspect 19: The method of any of aspects 15-18, wherein the second future communication is associated with an additional wireless communication device.

Aspect 20: The method of any of aspects 15-19, wherein the second set of dedicated resources corresponds to the first set of dedicated resources.

Aspect 21: The method of any of aspects 15-20, wherein the wireless communication device comprises a user equipment, and wherein transmitting the announcement comprises transmitting the announcement on a sidelink network.

Aspect 22: The method of any of aspects 15-20, wherein the wireless communication device comprises an integrated access and backhaul (IAB) node, and wherein transmitting the announcement comprises transmitting the announcement on an IAB network.

Aspect 23: A method of wireless communication performed by a wireless communication device, comprising: receiving, from an anchor device and using a first set of dedicated resources, an anchor status notification associated with a first future communication; and receiving from the anchor device, based at least in part on the anchor status notification, a resource recommendation associated with the first future communication.

Aspect 24: The method of aspect 23, further comprising transmitting the first future communication to the anchor device using a selected set of resources, wherein the selected set of resources is based at least in part on the resource recommendation.

Aspect 25: The method of aspect 24, further comprising selecting the selected set of resources based at least in part on the resource recommendation.

Aspect 26: The method of aspect 25, further comprising receiving, from an additional wireless communication device, an announcement that indicates a second future communication, wherein selecting the selected set of resources comprises selecting the selected set of resources based at least in part on the announcement.

Aspect 27: A method of wireless communication performed by a wireless communication device, comprising: receiving, from an anchor device and using a first set of dedicated resources, an anchor status notification associated with a first future communication; and transmitting to the anchor device, based at least in part on the anchor status notification, a resource recommendation associated with the first future communication.

Aspect 28: The method of aspect 27, further comprising transmitting an additional anchor status notification associated with the first future communication.

Aspect 29: The method of aspect 28, wherein receiving the anchor status notification comprises receiving the anchor status notification using a beam, and wherein transmitting the additional anchor status notification comprises transmitting the additional anchor status notification using the beam.

Aspect 30: The method of any of aspects 27-29, further comprising receiving, from an additional wireless communication device, an announcement that indicates a second future communication, wherein the resource recommendation is based at least in part on the announcement.

Aspect 31: An apparatus for wireless communication at a device, comprising a processor; memory coupled with the processor; and instructions stored in the memory and executable by the processor to cause the apparatus to perform the method of one or more aspects of aspects 1-14.

Aspect 32: A device for wireless communication, comprising a memory and one or more processors coupled to the memory, the memory and the one or more processors configured to perform the method of one or more aspects of aspects 1-14.

Aspect 33: An apparatus for wireless communication, comprising at least one means for performing the method of one or more aspects of aspects 1-14.

Aspect 34: A non-transitory computer-readable medium storing code for wireless communication, the code comprising instructions executable by a processor to perform the method of one or more aspects of aspects 1-14.

Aspect 35: A non-transitory computer-readable medium storing a set of instructions for wireless communication, the set of instructions comprising one or more instructions that, when executed by one or more processors of a device, cause the device to perform the method of one or more aspects of aspects 1-14.

Aspect 36: An apparatus for wireless communication at a device, comprising a processor; memory coupled with the processor; and instructions stored in the memory and executable by the processor to cause the apparatus to perform the method of one or more aspects of aspects 15-22.

Aspect 37: A device for wireless communication, comprising a memory and one or more processors coupled to the memory, the memory and the one or more processors configured to perform the method of one or more aspects of aspects 15-22.

Aspect 38: An apparatus for wireless communication, comprising at least one means for performing the method of one or more aspects of aspects 15-22.

Aspect 39: A non-transitory computer-readable medium storing code for wireless communication, the code comprising instructions executable by a processor to perform the method of one or more aspects of aspects 15-22.

Aspect 40: A non-transitory computer-readable medium storing a set of instructions for wireless communication, the set of instructions comprising one or more instructions that, when executed by one or more processors of a device, cause the device to perform the method of one or more aspects of aspects 15-22.

Aspect 41: An apparatus for wireless communication at a device, comprising a processor; memory coupled with the processor; and instructions stored in the memory and executable by the processor to cause the apparatus to perform the method of one or more aspects of aspects 23-26.

Aspect 42: A device for wireless communication, comprising a memory and one or more processors coupled to the memory, the memory and the one or more processors configured to perform the method of one or more aspects of aspects 23-26.

Aspect 43: An apparatus for wireless communication, comprising at least one means for performing the method of one or more aspects of aspects 23-26.

Aspect 44: A non-transitory computer-readable medium storing code for wireless communication, the code comprising instructions executable by a processor to perform the method of one or more aspects of aspects 23-26.

Aspect 45: A non-transitory computer-readable medium storing a set of instructions for wireless communication, the set of instructions comprising one or more instructions that, when executed by one or more processors of a device, cause the device to perform the method of one or more aspects of aspects 23-26.

Aspect 46: An apparatus for wireless communication at a device, comprising a processor; memory coupled with the processor; and instructions stored in the memory and executable by the processor to cause the apparatus to perform the method of one or more aspects of aspects 27-30.

Aspect 47: A device for wireless communication, comprising a memory and one or more processors coupled to the memory, the memory and the one or more processors configured to perform the method of one or more aspects of aspects 27-30.

Aspect 48: An apparatus for wireless communication, comprising at least one means for performing the method of one or more aspects of aspects 27-30.

Aspect 49: A non-transitory computer-readable medium storing code for wireless communication, the code comprising instructions executable by a processor to perform the method of one or more aspects of aspects 27-30.

Aspect 50: A non-transitory computer-readable medium storing a set of instructions for wireless communication, the set of instructions comprising one or more instructions that, when executed by one or more processors of a device, cause the device to perform the method of one or more aspects of aspects 27-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device for wireless communication, comprising:
    a memory; and
    one or more processors coupled to the memory, the one or more processors configured to:
        transmit information associated with a first future communication between the first wireless communication device and a second wireless communication device; and
        receive, using at least one set of dedicated resources, at least one announcement from at least one additional wireless communication device, wherein the at least one announcement indicates at least one second future communication associated with the at least one additional wireless communication device.

2. The first wireless communication device of claim 1, wherein the at least one additional communication device comprises an anchor device.

3. The first wireless communication device of claim 1, wherein the first wireless communication device comprises a first anchor device, and wherein the at least one additional communication device comprises a client device associated with a second anchor device.

4. The first wireless communication device of claim 1, wherein the one or more processors are further configured to:
 determine an available resource set based at least in part on the at least one announcement; and
 communicate with the second wireless communication device using the available resource set.

5. The first wireless communication device of claim 1, wherein the one or more processors, when transmitting information, are configured to transmit the information using a beam to be used for the first future communication.

6. The first wireless communication device of claim 5, wherein the one or more processors are further configured to communicate with the second wireless communication device using the beam.

7. The first wireless communication device of claim 5, wherein the at least one announcement comprises resource reservation information corresponding to the beam.

8. The first wireless communication device of claim 5, wherein the first wireless communication device comprises a first anchor, wherein the one or more processors are further configured to:
 receive an additional anchor status notification from a second anchor; and
 select the beam from a plurality of beams based at least in part on the additional anchor status notification.

9. The first wireless communication device of claim 1, wherein the one or more processors are further configured to receive, from the second wireless communication device, a resource recommendation that indicates a recommended set of resources for the first future communication.

10. The first wireless communication device of claim 1, wherein the one or more processors are further configured to transmit, to the second wireless communication device, a resource recommendation that indicates a recommended set of resources for the first future communication.

11. The first wireless communication device of claim 1, wherein the one or more processors, when transmitting the information, are configured to transmit the information using at least one additional set of dedicated resources.

12. The first wireless communication device of claim 11, wherein the at least one set of dedicated resources corresponds to the at least one additional set of dedicated resources.

13. The first wireless communication device of claim 1, wherein the first wireless communication device comprises a user equipment, and wherein transmitting the information comprises transmitting the information on a sidelink network.

14. The first wireless communication device of claim 1, wherein the first wireless communication device comprises an integrated access and backhaul (IAB) node, and wherein transmitting the information comprises transmitting the information on an IAB network.

15. A wireless communication device for wireless communication, comprising:
 a memory; and
 one or more processors operatively coupled to the memory, the memory and the one or more processors configured to:
  receive, from an anchor device and using a first set of dedicated resources, information associated with a first future communication; and
  transmit, based at least in part on the information and using a second set of dedicated resources, an announcement that indicates a second future communication.

16. The wireless communication device of claim 15, wherein the one or more processors, when receiving the information, are configured to receive the information using a beam.

17. The wireless communication device of claim 16, wherein the second future communication corresponds to the beam.

18. The wireless communication device of claim 16, wherein the announcement comprises resource reservation information corresponding to the beam.

19. The wireless communication device of claim 15, wherein the second future communication is associated with an additional wireless communication device.

20. The wireless communication device of claim 15, wherein the second set of dedicated resources corresponds to the first set of dedicated resources.

21. The wireless communication device of claim 15, wherein the wireless communication device comprises a user equipment, and wherein transmitting the announcement comprises transmitting the announcement on a sidelink network.

22. The wireless communication device of claim 15, wherein the wireless communication device comprises an integrated access and backhaul (IAB) node, and wherein transmitting the announcement comprises transmitting the announcement on an IAB network.

23. A wireless communication device for wireless communication, comprising:
 a memory; and
 one or more processors operatively coupled to the memory, the memory and the one or more processors configured to:
  receive, from an anchor device and using a first set of dedicated resources, information associated with a first future communication; and
  receive from the anchor device, based at least in part on the information, a resource recommendation associated with the first future communication.

24. The wireless communication device of claim 23, wherein the one or more processors are further configured to transmit the first future communication to the anchor device using a selected set of resources, wherein the selected set of resources is based at least in part on the resource recommendation.

25. The wireless communication device of claim 24, wherein the one or more processors are further configured to select the selected set of resources based at least in part on the resource recommendation.

26. The wireless communication device of claim 25, wherein the one or more processors are further configured to receive, from an additional wireless communication device, an announcement that indicates a second future communication,
 wherein the one or more processors, when selecting the selected set of resources, are configured to select the selected set of resources based at least in part on the announcement.

27. A method of wireless communications performed by a first wireless communications device, comprising:
 transmitting information associated with a first future communication between the first wireless communication device and a second wireless communication device; and
 receiving, using at least one set of dedicated resources, at least one announcement from at least one additional wireless communication device, wherein the at least one announcement indicates at least one second future communication associated with the at least one additional wireless communication device.

28. The method of claim 27, further comprising:
   determining an available resource set based at least in part on the at least one announcement; and
   communicating with the second wireless communication device using the available resource set.

29. The method of claim 27, further comprising:
   transmitting the information using at least one additional set of dedicated resources.

30. The method of claim 27, wherein the first wireless communication device comprises a user equipment, and wherein transmitting the information comprises transmitting the information on a sidelink network.

* * * * *